United States Patent
Harris et al.

(10) Patent No.: US 9,421,566 B2
(45) Date of Patent: Aug. 23, 2016

(54) CHEMICAL DELIVERY DATA ACQUISITION SYSTEM

(75) Inventors: Jaime L. Harris, Rosemount, MN (US); David Kensinger, Richfield, MN (US); Gary A. Brown, Faribault, MN (US); Christopher Molitor, Savage, MN (US); Karl J. Fritze, Hastings, MN (US)

(73) Assignee: Hydra-Flex, Inc., Burnsville, MN (US)

( * ) Notice: Subject to any disclaimer, the term of this patent is extended or adjusted under 35 U.S.C. 154(b) by 137 days.

(21) Appl. No.: 12/961,041

(22) Filed: Dec. 6, 2010

(65) Prior Publication Data

US 2011/0192433 A1    Aug. 11, 2011

Related U.S. Application Data

(60) Provisional application No. 61/266,919, filed on Dec. 4, 2009.

(51) Int. Cl.
*B08B 7/04* (2006.01)
*B05B 12/08* (2006.01)
(Continued)

(52) U.S. Cl.
CPC ............. *B05B 12/081* (2013.01); *B01F 3/0865* (2013.01); *B01F 5/0413* (2013.01); *B01F 15/00155* (2013.01); *B01F 15/00194* (2013.01); *B01F 15/00344* (2013.01); *B01F 15/0425* (2013.01); *B05B 7/2443* (2013.01); *G01F 23/02* (2013.01); *G01F 23/292* (2013.01); *G01F 23/2962* (2013.01); *G01F 23/68* (2013.01); *G01F 23/72* (2013.01); *A47L 15/449* (2013.01); *A47L 15/4418* (2013.01); *A47L 15/4427* (2013.01); *B01F 2003/0896* (2013.01); *B08B 3/00* (2013.01); *B08B 3/02* (2013.01); *B08B 3/024* (2013.01); *B08B 3/04* (2013.01);

(Continued)

(58) Field of Classification Search
CPC ............. B08B 3/00; B08B 3/02; B08B 3/04; B08B 3/024; A47L 15/4418; A47L 15/4427; A47L 15/449; B60S 3/00; B60S 3/04; B05B 12/081; B05B 7/2443; B01F 3/0865; B01F 5/0413; B01F 15/00155; B01F 15/00194; B01F 15/00344; B01F 15/0425
USPC ............. 134/18, 34, 36, 42, 99.2, 100.1, 123
See application file for complete search history.

(56) References Cited

U.S. PATENT DOCUMENTS 2,785,012 A  *  3/1957  Frewin .......................... 239/310
3,307,744 A  *  3/1967  Burford ............................ 222/1

(Continued)

OTHER PUBLICATIONS

Application and File history for U.S. Appl. No. 12/879,694, filed Sep. 10, 2010. Inventors: Molitor et al.

*Primary Examiner* — Bibi Carrillo
(74) *Attorney, Agent, or Firm* — Dorsey & Whitney LLP

(57) ABSTRACT

A system for controlling and monitoring the chemical usage in a car wash systems that form an aqueous cleaning solution by diluting a cleaning chemical concentrate in a process water stream to form. Level sensors are mounted to the bulk containers containing the chemical concentrate to measure and track the usage of the chemical concentrates. The usage data is collected and used to adjust flow rate controllers controlling the dilution of the concentrate into the process water stream. The system can be integrated into continuous processes where the aqueous cleaning solution is dispensed immediately after production and batch processes where the cleaning solution is stored temporarily before being dispensed onto a vehicle.

15 Claims, 22 Drawing Sheets

(51) Int. Cl.
*B01F 3/08* (2006.01)
*B01F 5/04* (2006.01)
*B01F 15/00* (2006.01)
*B01F 15/04* (2006.01)
*B05B 7/24* (2006.01)
*G01F 23/02* (2006.01)
*G01F 23/292* (2006.01)
*G01F 23/296* (2006.01)
*G01F 23/68* (2006.01)
*G01F 23/72* (2006.01)
*B08B 3/00* (2006.01)
*B08B 3/04* (2006.01)
*B08B 3/02* (2006.01)
*A47L 15/44* (2006.01)
*B60S 3/00* (2006.01)
*B60S 3/04* (2006.01)
*G01G 17/02* (2006.01)
*G01G 19/18* (2006.01)

(52) U.S. Cl.
CPC ..... *B60S3/00* (2013.01); *B60S 3/04* (2013.01); *G01G 17/02* (2013.01); *G01G 19/18* (2013.01)

(56) References Cited

U.S. PATENT DOCUMENTS

| | | | |
|---|---|---|---|
| 4,067,665 A | | 1/1978 | Schwartzman |
| 5,033,489 A * | | 7/1991 | Ferre et al. .................. 134/57 R |
| 5,219,422 A * | | 6/1993 | Sato ............................. 222/282 |
| 5,419,347 A | | 5/1995 | Carruth |
| 5,439,020 A | | 8/1995 | Lockhart |
| 6,113,007 A | | 9/2000 | Bagnara et al. |
| 6,277,207 B1 * | | 8/2001 | Gauthier ......................... 134/18 |
| 6,718,216 B2 | | 4/2004 | Grier |
| 7,201,290 B2 * | | 4/2007 | Mehus et al. ................... 222/77 |
| 2002/0147124 A1 * | | 10/2002 | Klos et al. ..................... 510/447 |
| 2003/0127534 A1 | | 7/2003 | Firestone |
| 2007/0119217 A1 * | | 5/2007 | Worthington ................... 68/158 |
| 2008/0046278 A1 * | | 2/2008 | Sanville et al. ................. 705/1 |
| 2008/0204555 A1 * | | 8/2008 | Hughes .......................... 348/148 |
| 2008/0228346 A1 * | | 9/2008 | Lucas et al. ..................... 701/33 |
| 2009/0090415 A1 | | 4/2009 | Harris et al. |
| 2009/0139545 A1 * | | 6/2009 | Rowlands et al. .............. 134/18 |
| 2010/0186778 A1 * | | 7/2010 | Martin ............................ 134/34 |
| 2011/0043379 A1 * | | 2/2011 | Auer ............................. 340/928 |
| 2013/0239992 A1 * | | 9/2013 | Detrick ........................... 134/18 |

* cited by examiner

GRAVIMETRIC METERING

LEVEL METERING

US 9,421,566 B2

CHEMICAL DELIVERY DATA ACQUISITION SYSTEM

RELATED APPLICATION

This application claims the benefit of U.S. Provisional Application No. 61/266,919, entitled CHEMICAL DELIVERY DATA ACQUISITION SYSTEM and filed Dec. 4, 2009, said application being fully incorporated herein by reference.

FIELD OF THE DISCLOSURE

The present invention is generally related to a system and related methods obtaining information from a chemical dispensing system and managing chemical usage information. Specifically, the present invention is related to collecting chemical usage data on a per event basis for use in a process control and transmitting the usage information to processing and control systems to control chemical delivery.

BACKGROUND OF DISCLOSURE

The use of chemicals in cleaning, and particularly cleaning with chemicals diluted in water to form aqueous cleaning solutions, is used in a variety of fields and in a variety of applications. In particular, a market has emerged over the last several decades for automated car washes, and particularly drive-through car washes, as more and more people no longer have access to self-wash facilities or the time to clean their own cars. As drive-through car washes often involve applying large quantities of several different cleaning solutions to each vehicle, the increased popularity of drive-through car washes has generally led to widespread use of cleaning and treatment chemicals in large quantities. Furthermore, competitive pressures to adequately clean cars for repeat business encourage excessive chemical usage beyond the necessary amount to ensure each car is fully cleaned. The widespread and often excessive use of the typically hazardous cleaning chemical can result in discharge of the chemicals into lakes, streams and waters contaminating the environment and ground water. In response to the increased and widespread use of cleaning chemicals in car washes, government regulations controlling the use of the cleaning chemicals have become farther reaching and stringent to encourage careful management of the chemical usage.

A typical car wash with chemical dispensing system operates by diluting a quantity of a concentrated cleaning chemical with washing water. Typically, a bulk container containing the concentrated cleaning chemical is connected to a venturi style eductor linked to a process water supply. The bulk container can contain a float to sense the tank level or can be manually refilled when the concentrated chemical is exhausted. The eductor crudely dilutes the concentrated cleaning chemical with the process water as the water flows through the eductor to form an aqueous cleaning solution, which is often stored in a batch tank before being applied to a car. An injector pump can then be used to pneumatically dispense the aqueous chemical solution onto a car. While the dilution system is a relatively simple concept, maintaining and fine tuning the dilution rate of the cleaning chemical is difficult as a number of constantly changing process variables can cause the dilution rate to change. The process variables can include, but are not limited to, the relative concentration of the batching process, the dosing pump rate, and the pressure and flow rate of the incoming process water.

As a result, the typical car wash cannot accurately track the real time chemical usage or can only roughly estimate the actual chemical usage per washing event. Typically, operators can only estimate the usage of the cleaning chemicals per washing event by dividing the bulk amount of cleaning fluid used by the car wash for a given period by the estimated amount of cars washed during that period. Consequently, accurate real time analysis of the chemical usage is often difficult if not impossible.

Furthermore, many car wash systems rely on relatively inaccurate high volume dosing pumps and eductors, which can handle large quantities of cleaning solution, but can cause the dilution rate to vary significantly. As a result, dilution ratios produced by even the best systems can vary substantially with each wash and can change without notice from batch to batch and even the dilution within a single batch. Consequently, even if real time measurement and tracking of chemical usage was practical, the dosing systems themselves require constantly monitoring and adjustment, which is often cost prohibitive given the manual monitoring and adjustment required.

Similarly, the cleaning chemicals themselves can prevent the use of many types of more sophisticated fluid monitoring devices. The cleaning chemicals used for cleaning cars are typically very corrosive and/or oxidizing. Sensitive fluid monitoring devices can be damaged by the cleaning chemicals themselves, preventing accurate measurement of the chemical fluids.

While systems for monitoring and controlling the dispensing of chemicals are available, the presently available systems are typically "open-loop" processes. Open-loop control processes monitor the input into a system to determine if corrections to the system are required based on the conditions of the input stream. However, open-loop processes do not monitor the output from the system for feedback on the effectiveness of the changes to the system, which can cause the open-loop process to miss errors in the system. Despite the potential inaccuracy with open-loop processes, open-loop processes are typically used in car wash systems as significantly cheaper than alternative processes.

Improved venturi eductors, such as the CHEM-FLEX injector manufactured by Hydra-Flex Incorporated of Burnsville, Minn., provide more stable dilution rates by eliminating the need for an intermediate batching process and the associated process variables. The reference is herein incorporated by reference in its entirety. However, CHEM-FLEX injectors are still ultimately limited by the properties of chemical input into the injector, of which there is no convenient method of monitoring and adjusting. As a result, even the improved CHEM-FLEX injectors cannot provide sufficiently constant dilution rates.

SUMMARY OF DISCLOSURE

The present invention is directed to a system for monitoring the cleaning chemical usage in car washes on a per car basis and controlling the amount of cleaning chemical used per car to limit the amount of the cleaning chemical used per car washed to only the amount necessary to wash each car. The dosage information collected by the system is converted into digital information, which can be provided to a variety of data processing and operator interfaces such as programmable logic controllers and microprocessors. According to an embodiment of the present invention, the system can be adapted to be controlled and maintained through internet-based software applications via hand-held personal data assistants, mobile phones and the like. The system can also be adapted to restrict access to the dosage equipment to prevent unauthorized adjustment of the dilution rates.

According to an embodiment of the present invention, the system can be adapted to monitor the rate of chemical usage and translate the information into digital data to provide a closed-loop control feedback for active control of dilution rate. The chemical usage data can be used as a data input to change dilution rates, monitor chemical consumption, provide real-time cost per dispensing event data, and estimate when bulk chemical containers need replacement or re-filing.

According to an embodiment of the present invention, software applications that manage the collected data can reside on multiple platforms including, but not limited to, programmable logic controllers, personal computers, network storage systems and web based applications. The system can be networked to a local network or the internet allowing the collected data to be viewed and modified by authorized users via the internet. Applications and interfaces for linking with the system can be installed on smart phones, personal digital assistants, and other networkable devices.

According to an embodiment of the present invention, the system can comprise hyper-concentrates of the cleaning chemical and control dilution of these hyper-concentrates to form aqueous cleaning solutions. Hyper-concentrates can be stored in smaller containers than regular concentrates while still creating the same quantity of aqueous cleaning solution. Hyper-concentrates typically contain less water than regular liquid concentrates allowing for the same effective amount of cleaning solution to be made as traditional concentrates without incurring the expense of shipping the additional water contained in regular concentrate. An added advantage is that small quantities of hyper-concentrate can be packaged in durable bags rather than rigid containers. Bags have the additional benefits of being lightweight, lower in cost, and more environmentally friendly as well as being collapsible once all the hyper-concentrate is used, thereby freeing up considerable floor space. Bags also allow for the use of unique interface connections whose geometry can be proprietary to cleaning agents, suppliers and customers. The specialized connections can prohibit incorrect application and control sales channels and proprietary chemical application.

According to an embodiment of the present invention, the bulk containers can comprise RFID tags so as to control correct chemical application, authenticate OEM chemicals, monitor shelf-life, program control software, and automatically set dilution rates.

The above summary of the invention is not intended to describe each illustrated embodiment or every implementation of the present invention. The figures and the Detailed Description that follow more particularly exemplify these embodiments.

BRIEF DESCRIPTION OF FIGURES

The invention can be more completely understood in consideration of the following detailed description of various embodiments of the invention in connection with the accompanying drawings, in which.

Figure 1:
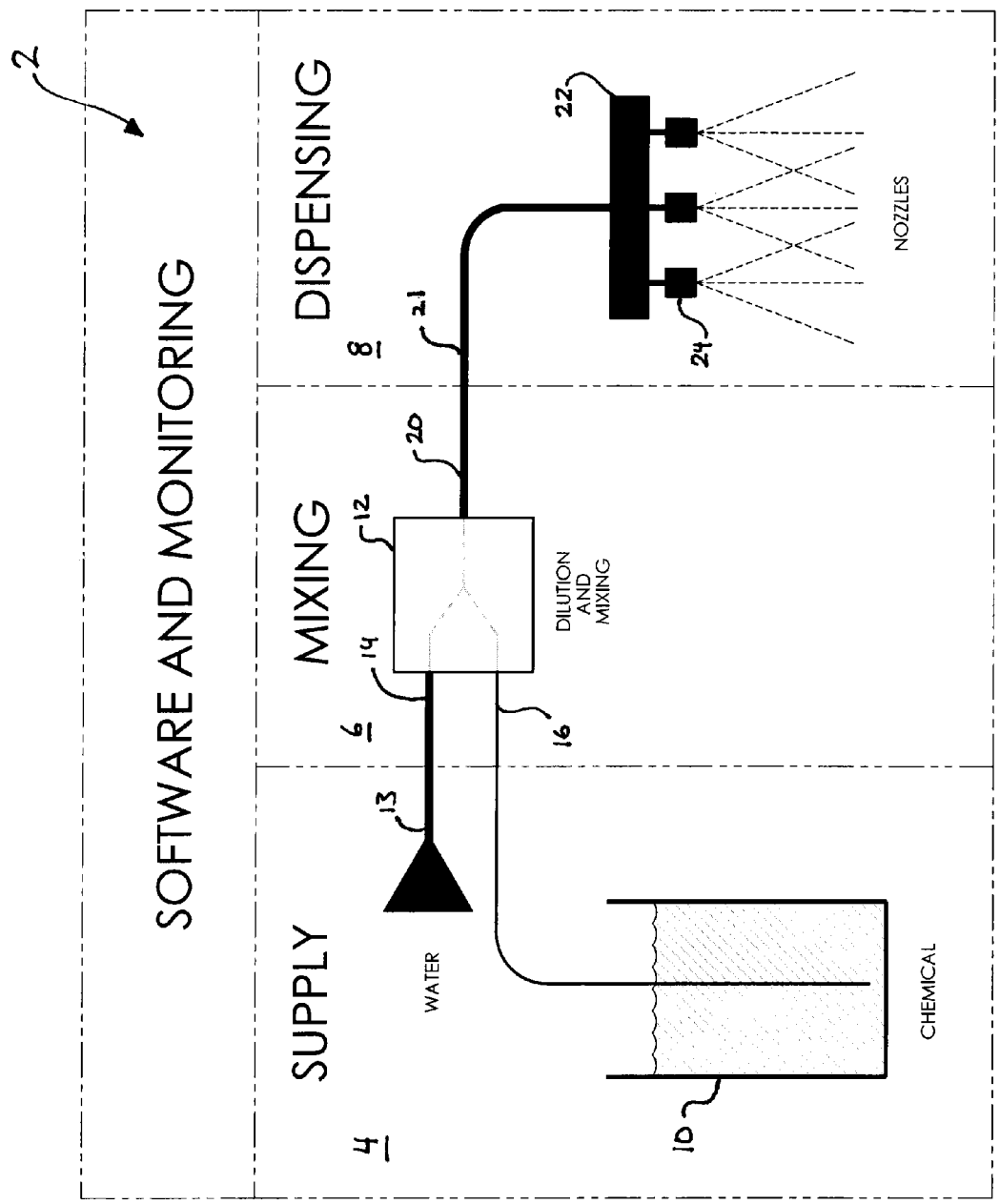
FIG. 1 is a representative view of a typical chemical dispensing system for an automated car wash.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF FIGURES

As shown FIG. 1, a conventional car wash system 2 for dispensing a diluted cleaning solution on a vehicle in an automated car wash generally comprises a supply system 4, a mixing system 6 and a dispensing system 8. The supply system 4 further comprises at least one bulk container 10 for storing a concentrate of cleaning chemicals. The mixing system 6 further comprises a dilution/mixing apparatus 12 having a process water inlet 14, at least one concentrate inlet 16 and a cleaning solution outlet 20. An elongated conduit 21 can be positioned at the cleaning solution outlet 20 to allow even mixing of the cleaning solution before reaching the dispensing system 8. The dispensing system 8 can further comprise a manifold 22 having at least one nozzle 24 for dispensing a diluted cleaning solution on a vehicle.

Generally, in operation, the cleaning chemical concentrate is drawn from the bulk container 10 and diluted within the dilution/mixing apparatus 12 with a process water stream 13 from the process water inlet 14 to produce a diluted aqueous cleaning solution. The cleaning solution is then directed from the dilution/mixing apparatus 12 through the cleaning solution outlet 20 to the manifold 22 and applied to a vehicle.

Figure 2:
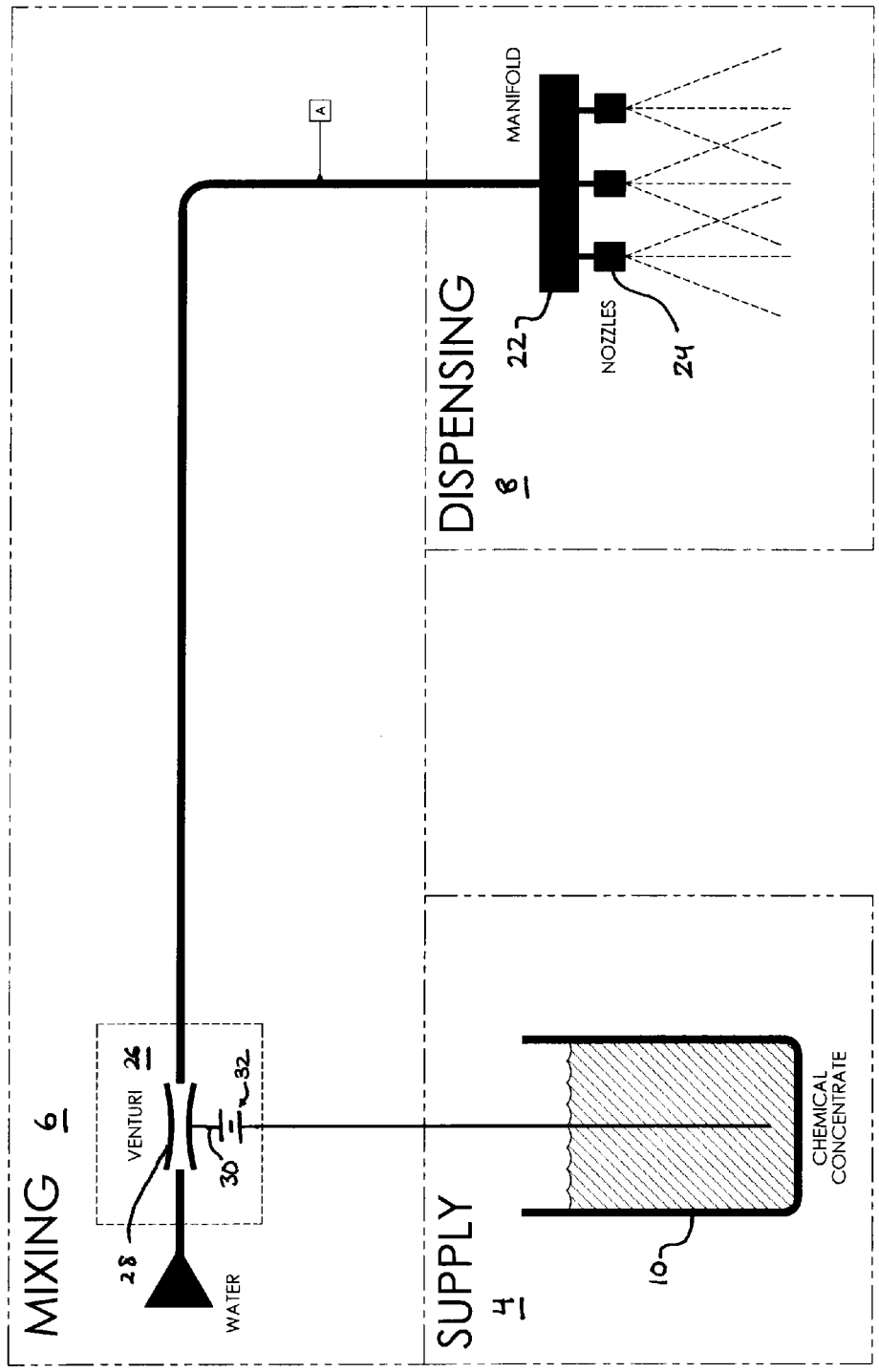
FIG. 2 is a schematic view of a typical chemical dispensing system for an automated car wash.
Figure 3:
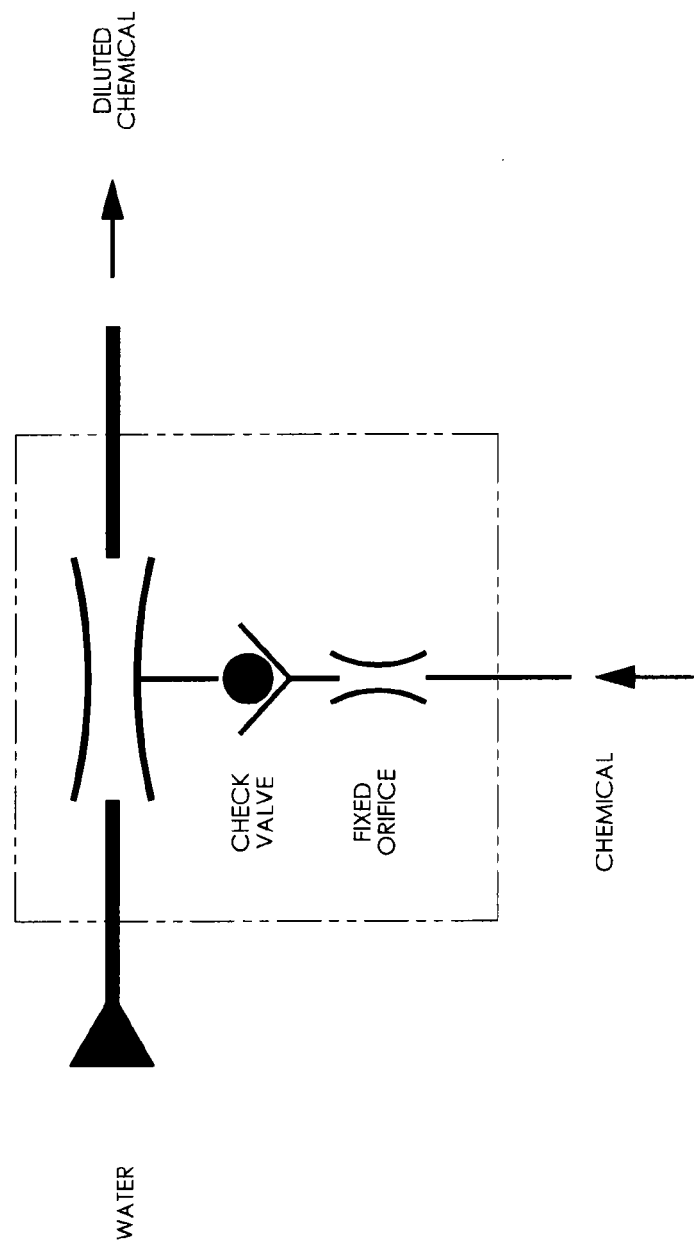
FIG. 3 is a schematic view of a mixing/dilution apparatus of the chemical dispensing system depicted in FIG. 2.

As shown in FIGS. 2-3, the dilution/mixing apparatus 12 can comprise a venturi eductor 26 having a venturi tube 28 intersected by an injector tube 30. The venturi tube 28 comprises a gradually increasing cross-sectional area, thereby creating a pressure change in the fluid flowing through the venturi tube 28 to draw fluid from the injector tube 30. The injector tube 30 can further comprise an orifice 32 defining the effective diameter of the injector tube 30. The venturi tube 28 is operably linked to the process water inlet 14 while the injector tube 30 is operably linked to the concentrate inlet 16. In operation, process water is forced through the venturi tube 28 creating a pressure difference in the process water stream, which draws concentrate from the concentrate inlet 16 to create the cleaning solution.

Figure 4:
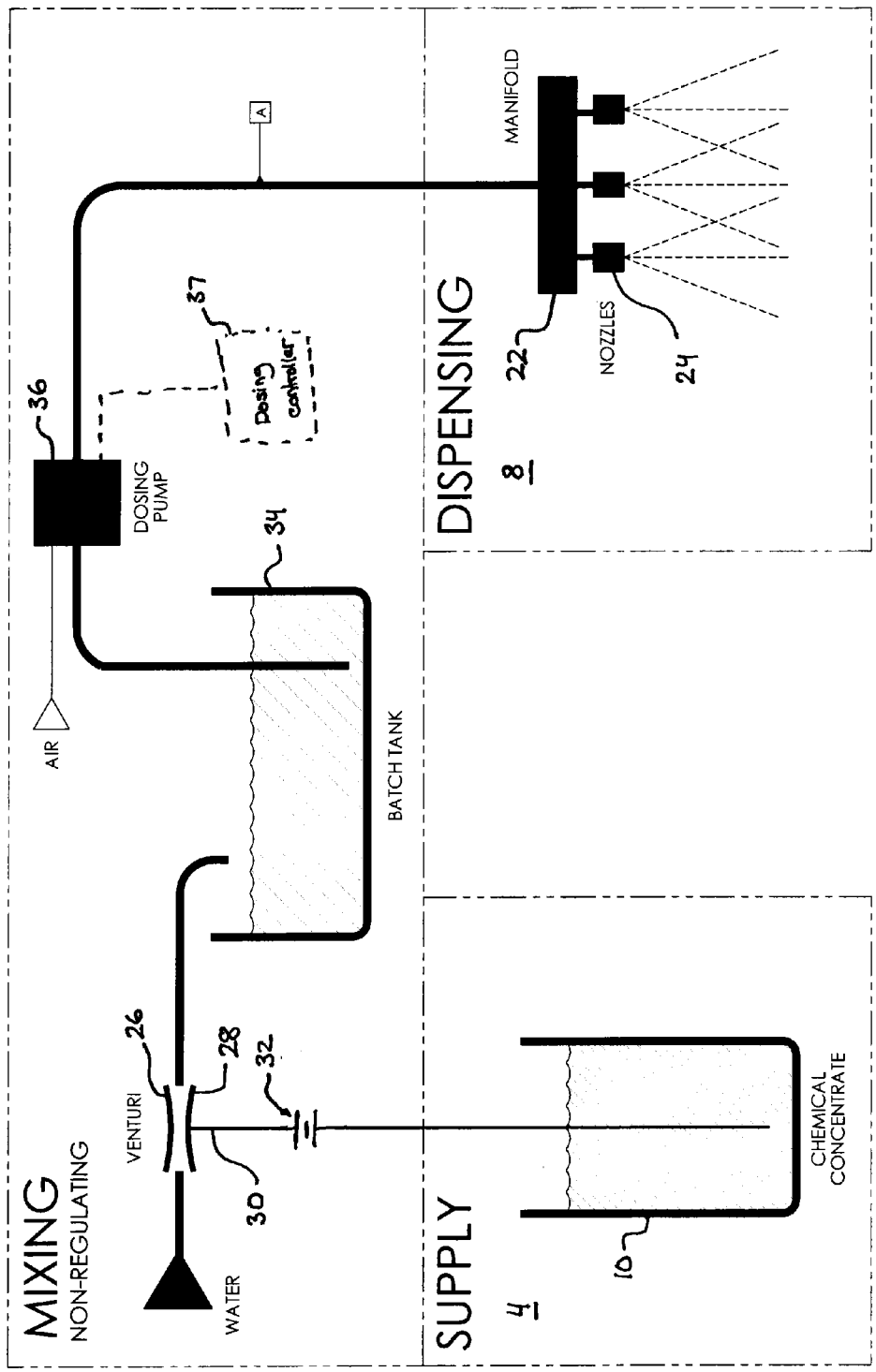
FIG. 4 is a schematic view of a typical chemical dispensing system for an automated car wash.

As shown in FIG. 4, a conventional mixing system 6 can further comprise a batch tank 34 and a dosing pump 36. The batch tank 34 is adapted to temporarily receive a quantity of diluted cleaning solution from the dilution/mixing apparatus 12. The dosing pump 36 is adapted to draw a predetermined "dose" of cleaning solution from the batch tank 34 and provide the dose of cleaning solution to the dispensing system 8. As depicted in FIG. 3, the dosing pump 36 can comprise a pneumatically driven diaphragm pump or electrically driven solenoid piston pump using an air supply to drive the dosing pump 36 and supply the cleaning solution, such as, for example, by pressurizing the diluted aqueous chemical solution and metering or pulsing the flow of the diluted solution through the nozzle apparatus 26. The dosing pump 36 can further comprise a dosing controller 37 such as a PLC or similar control device for operating the dosing pump 36 and controlling the metering or pulsing of the flow of the diluted solution.

Figure 5:
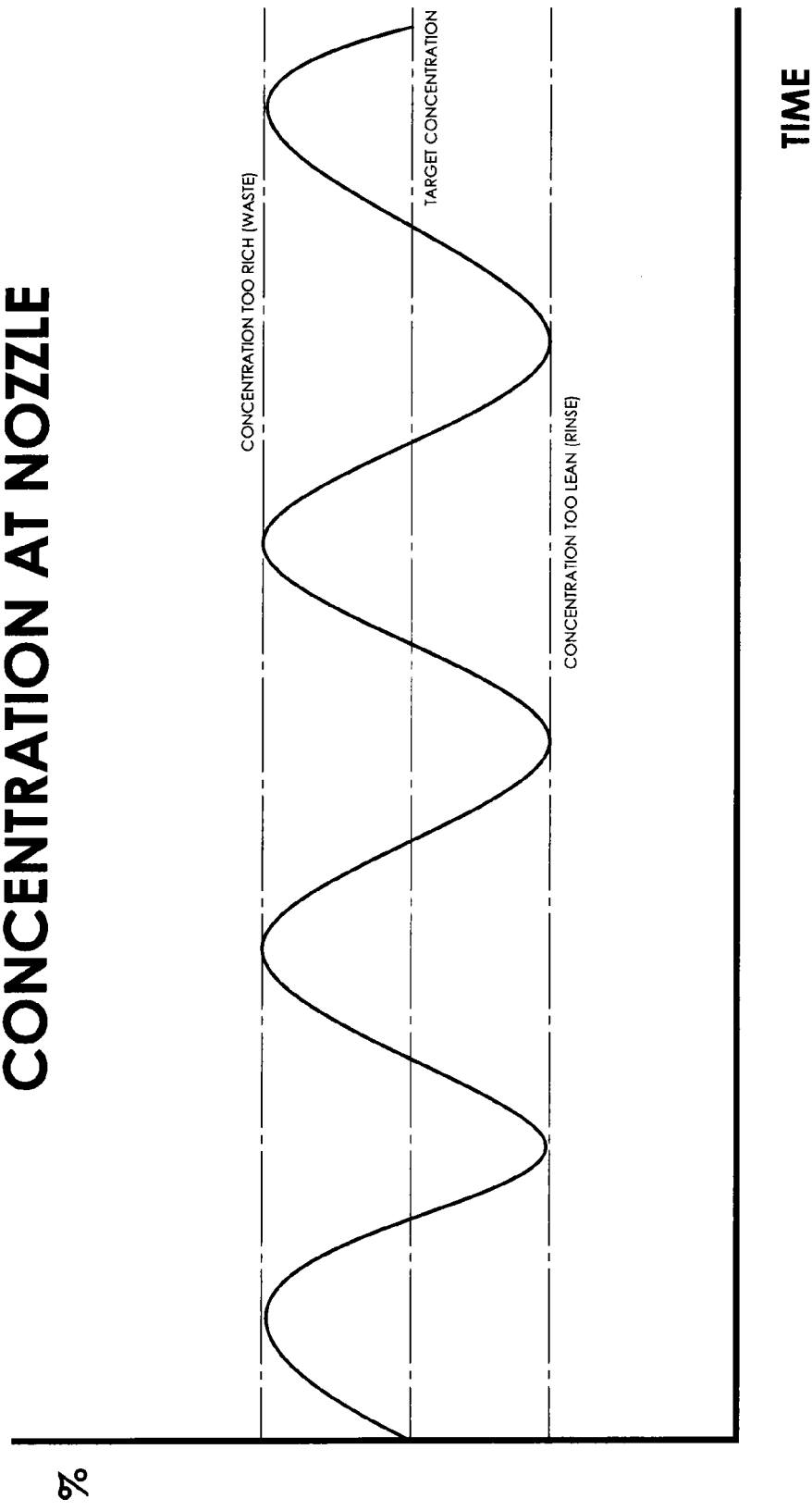
FIG. 5 is a graph illustrating the change in dilution rate at the output of the chemical dispensing system of FIG. 4.
Figure 6:
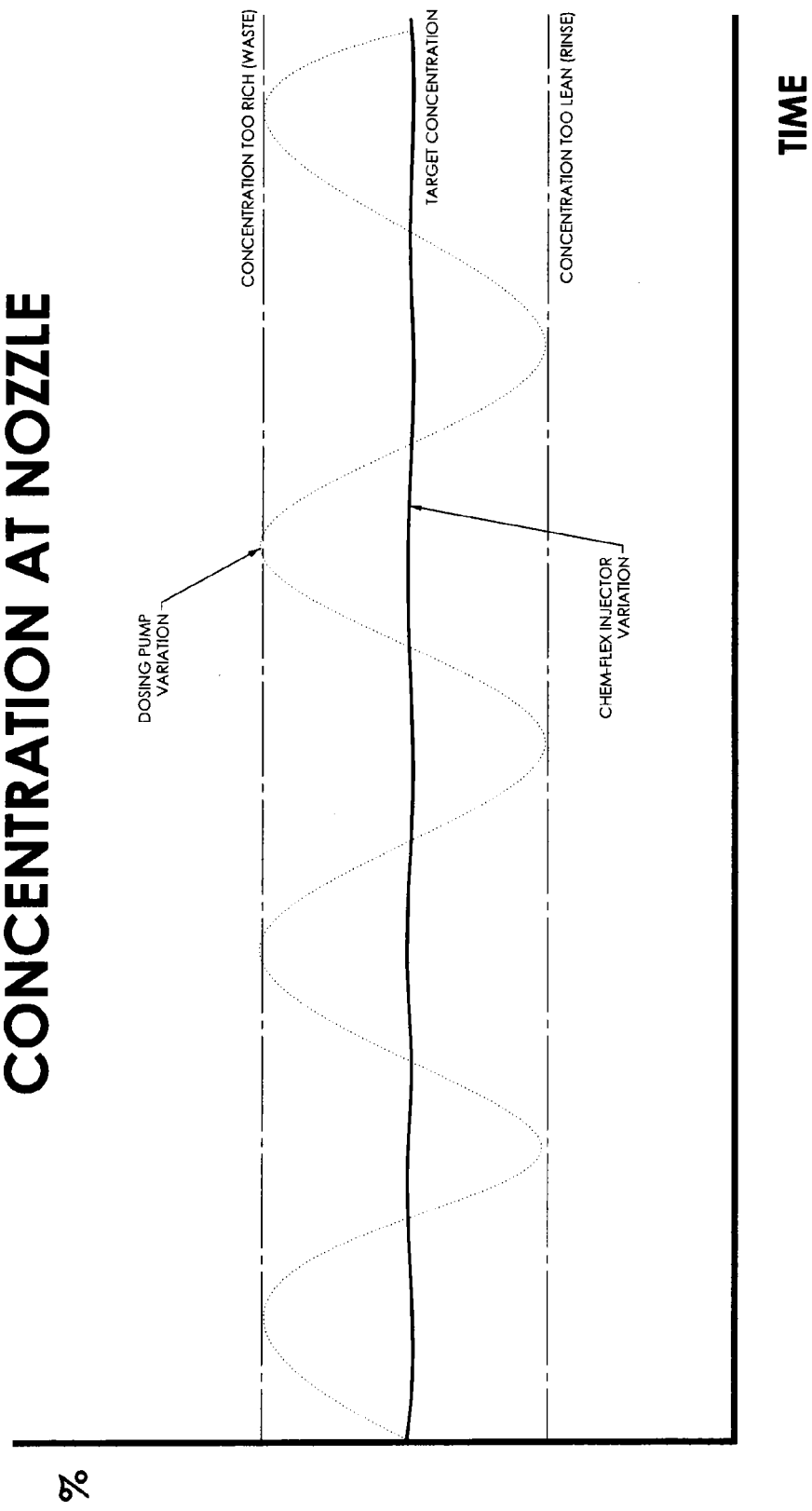
FIG. 6 is a graph illustrating the change in dilution rate at the output of the chemical dispensing system of FIG. 2.

As shown in FIG. 5, the concentration taken at point A of FIG. 4 between the dosing pump 36 and nozzle apparatus 24 in a mixing system 6 having batch step can vary significantly over time. The concentration of cleaning chemicals can periodically vary from too rich where the dilution rate is above the predetermined ideal dilution rate and too lean where the dilution rate is below the predetermined ideal dilution rate. While on the average the correct dilution rate is achieved, the dilution rate is typically above or below the predetermined ideal dilution rate for an individual car causing either excess chemical usage or preventing effective cleaning of the car. As shown in FIG. 6, a mixing/dilution apparatus 12 without a batch stage and having mixing/dilution apparatus 12 comprising a venturi eductor 26 according to an embodiment of the present invention can reduce the severity of the fluctuations in the dilution rate.

Figure 7:
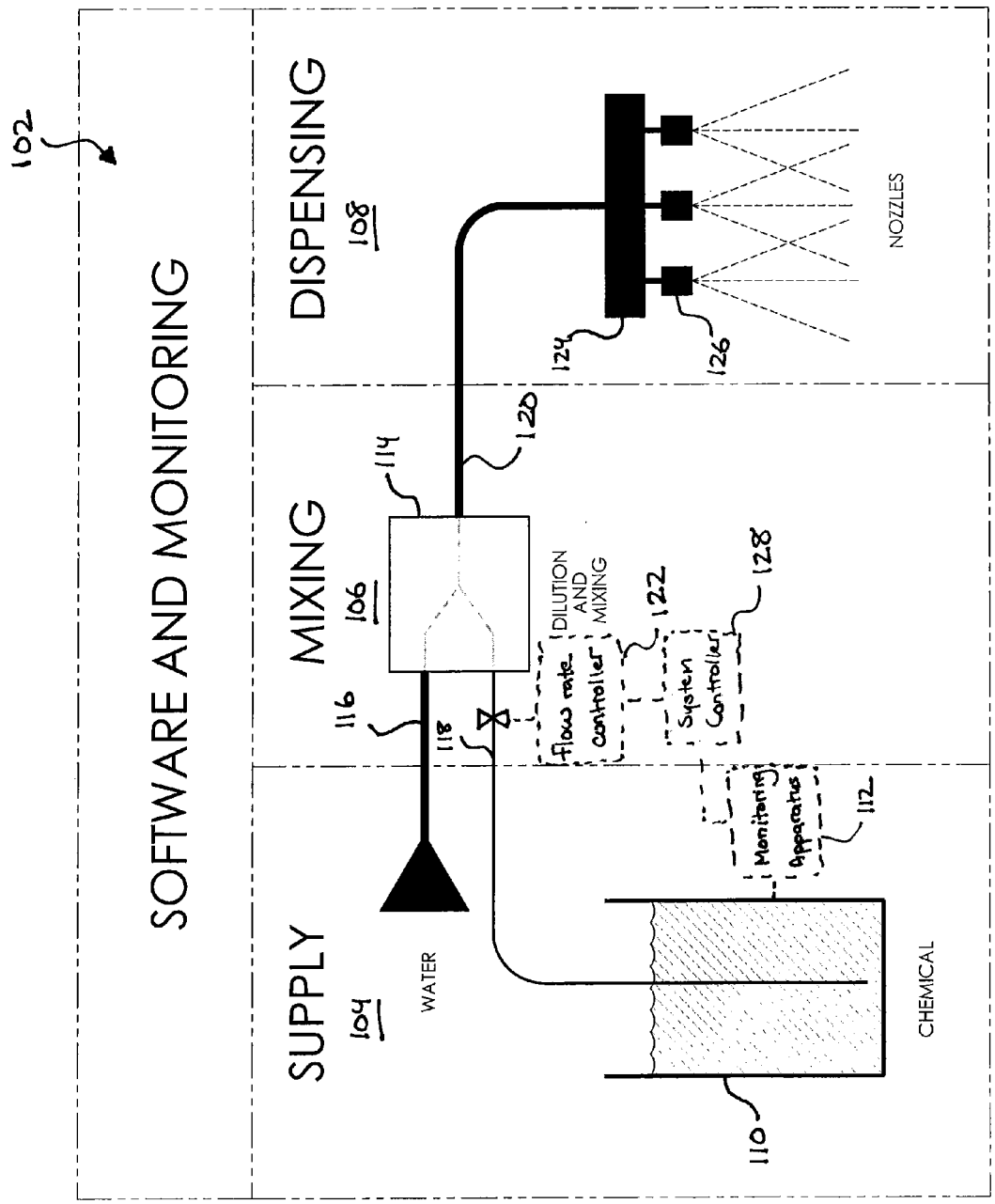
FIG. 7 is a representative view of a chemical dispensing system for an automated car wash according to an embodiment of the present invention.

As shown in FIG. 7, according to an embodiment of the present invention, a car wash system 102 for dispensing a diluted chemical cleaning solution on a vehicle in an automated car wash also generally comprises a supply system 104, a mixing system 106 and a dispensing system 108. The supply system 104 also comprises at least one bulk container 110 for storing a concentrate of cleaning chemicals and a monitoring assembly 112 for measuring usage of chemical concentrate in each bulk container 110 in real time. The mixing system 106 comprises a dilution/mixing apparatus 114 having a process water inlet 116, at least one concentrate inlet 118 and a cleaning solution outlet 120. The mixing system 106 further comprises a flow rate controller 122 for regulating the flow of concentrate through the concentrate inlet 118. The dispensing system 108 can further comprise a manifold 124 having at least one nozzle 126 for dispensing a diluted cleaning solution on a vehicle. The chemical dispensing system 102 further comprises a control system 128 or controller for receiving the usage data from the monitoring assembly 112 and adjusting the flow rate controller 122 as required.

Figure 8:
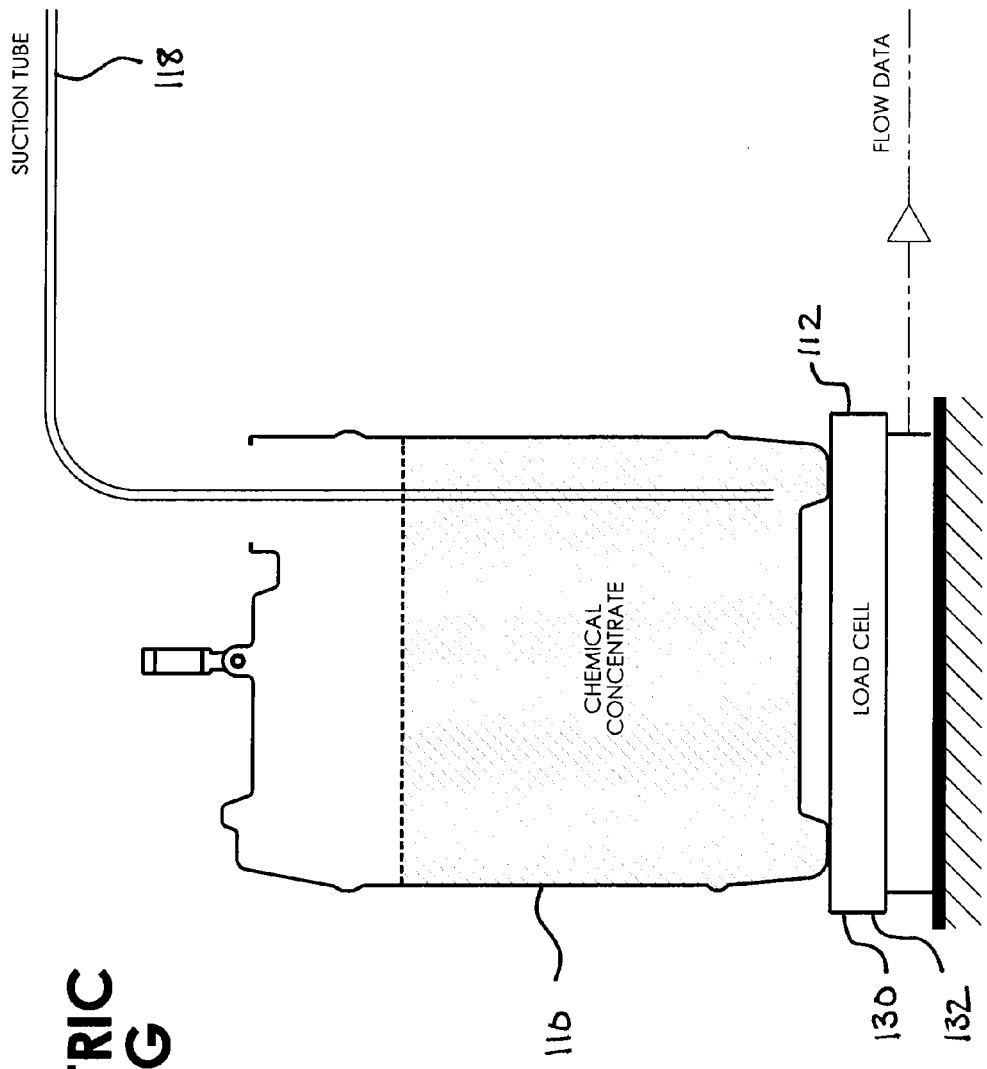
FIG. 8 is a schematic view of the supply system of the chemical dispensing system for an automated car wash depicted in FIG. 7, according to an embodiment of the present invention.
Figure 9:
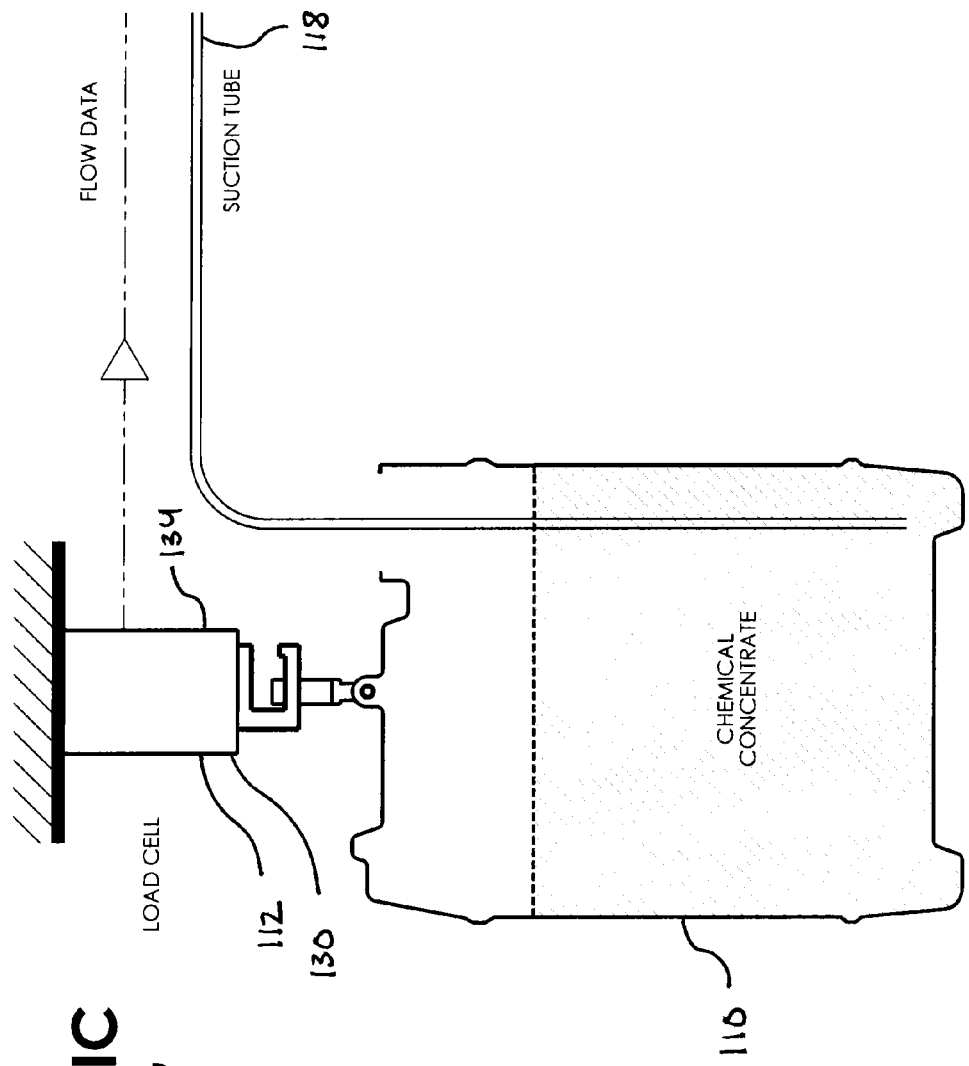
FIG. 9 is a schematic view of the supply system of the chemical dispensing system for an automated car wash depicted in FIG. 7, according to an embodiment of the present invention.
Figure 10:
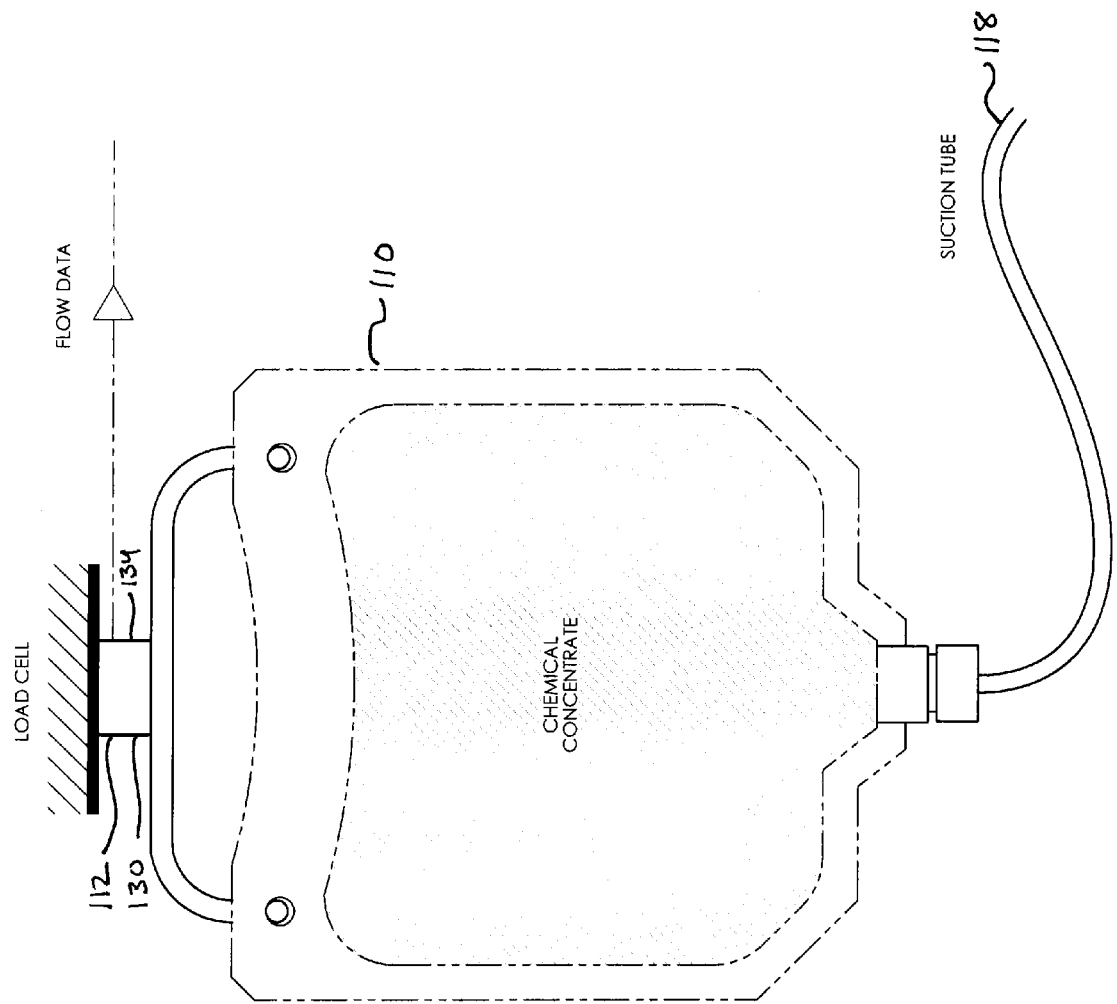
FIG. 10 is a schematic view of the supply system of the chemical dispensing system for an automated car wash depicted in FIG. 7, according to an embodiment of the present invention.

As shown in FIGS. 8-10, the monitoring assembly 112 can comprise a load cell 130 configured to monitor the concentrate usage by measuring the change in weight of the bulk container 110 over time. As shown in FIG. 8, according to an embodiment of the present invention, the load cell 130 can comprise a platform scale 132 on which the bulk container 110. As shown in FIGS. 7-8, according to an embodiment of the present invention, the load cell 30 can comprise a gravimetric scale 134 from which the bulk container 110 is suspended. The load cell 130 is adapted to measure the change in weight of the concentrate over time to determine the flow rate at which the concentrate leaves the bulk container 110 and extrapolate the dilution rate of the concentrate into the process water stream. For example, a 5-gallon bulk container 110 weighing 42 lbs. being fed process water at 0.01 gpm at a dilution rate of 600:1 would be using 0.083 lbs per minute. According to an embodiment of the present invention, the load cell 48 can have a resolution of about 10,000 divisions to about 20,000 divisions. According to an embodiment of the present invention, the flow rate information collected by the load cell 130 can detect leaks or blockages within the system which interrupt or disrupt the dilution of concentrate within the concentrate inlet 118. For example, if the measured concentrate flow rate leaving the bulk container 110 exceeds a predetermined or predicted rate, a rupture in the system could be causing the concentrate to leak from the system 102. Similarly, if the measured concentrate flow rate is less than the predicted or predetermined rate, a blockage in the system 102 could be preventing the concentrate from flowing properly through the system 102.

Figure 11:
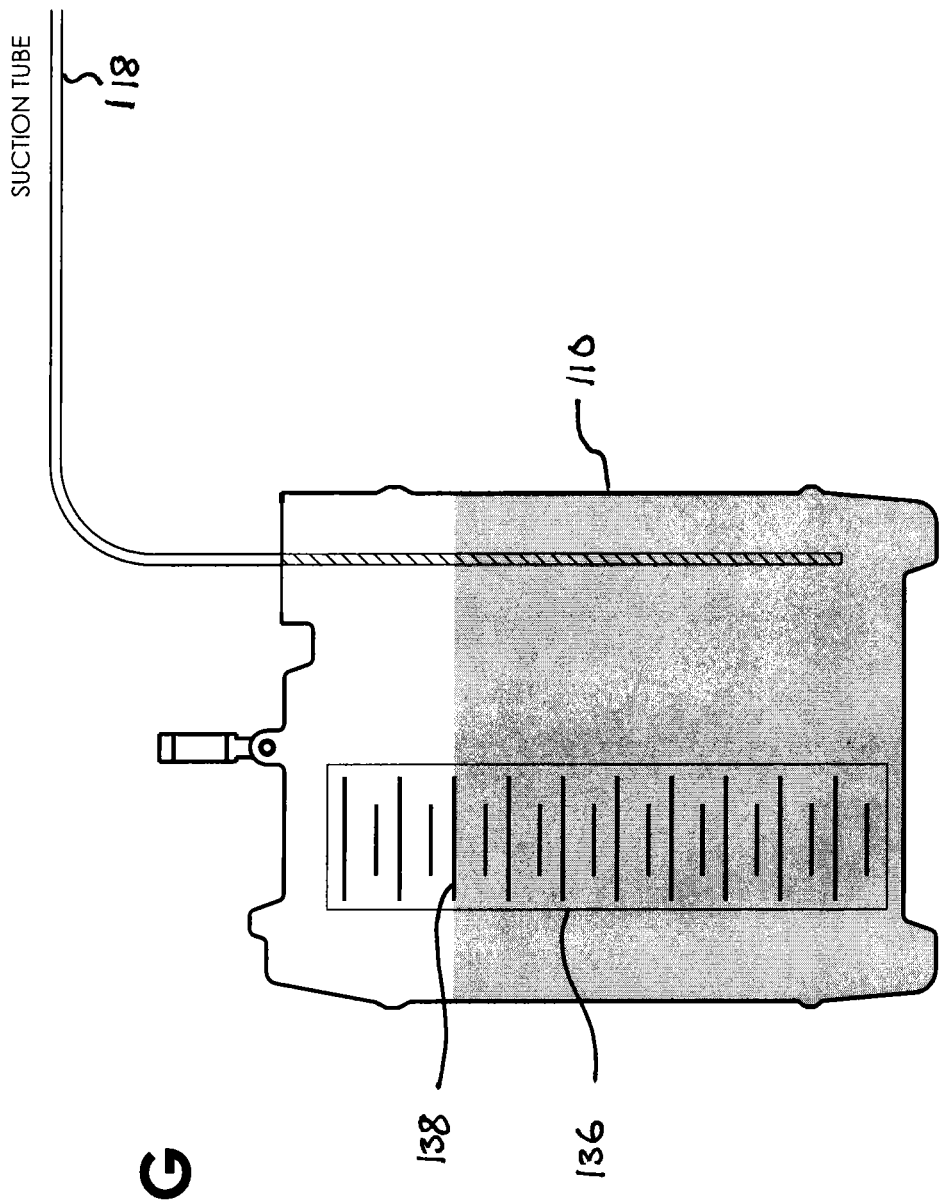
FIG. 11 is a schematic view of the supply system of the chemical dispensing system for an automated car wash depicted in FIG. 7, according to an embodiment of the present invention.
Figure 12:
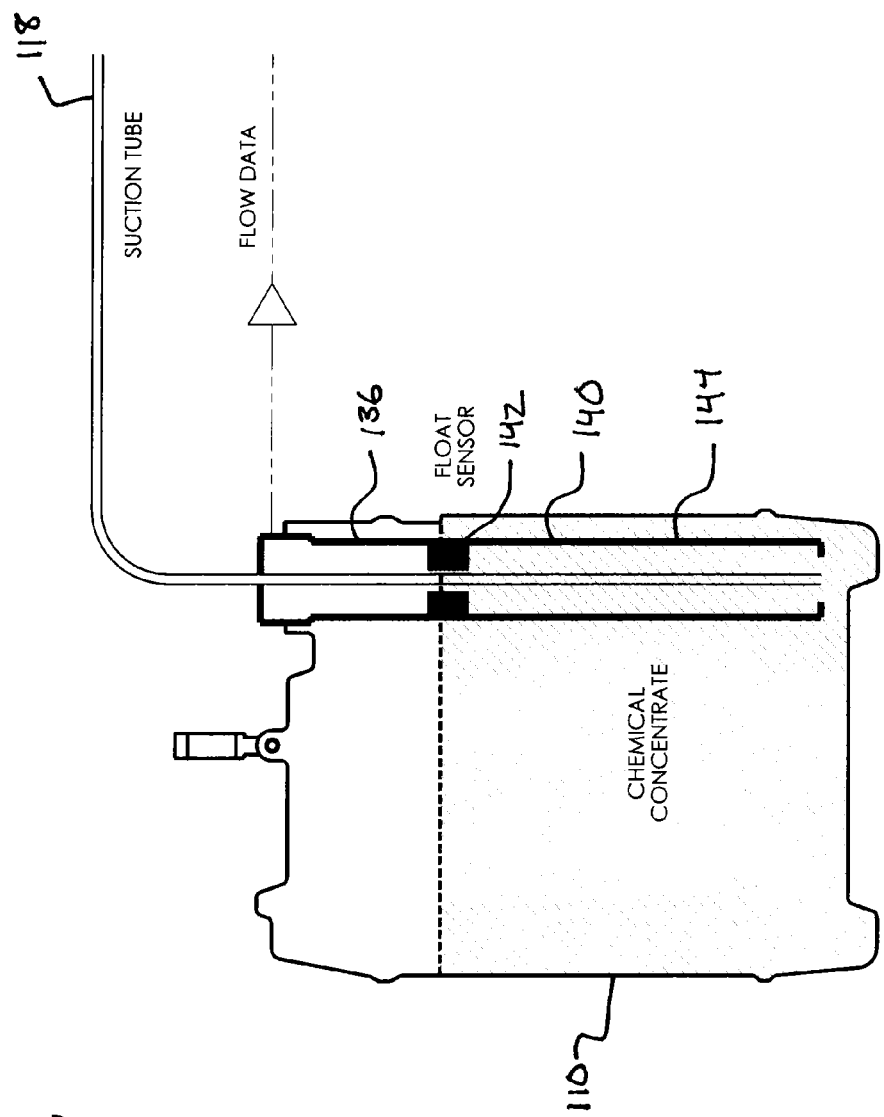
FIG. 12 is a schematic view of the supply system of the chemical dispensing system for an automated car wash depicted in FIG. 7, according to an embodiment of the present invention.

As shown in FIGS. 11-12, the monitoring assembly 112 can comprise a level measuring assembly 136 operably linked to each of the bulk containers 110 to monitor the concentrate usage by measuring the depth of the concentrate within the bulk container 110. The level measuring assembly 136 is adapted to measure the change in depth of the concentrate within the bulk container 110 and extrapolate the flow rate of the concentrate into the mixing/dilution apparatus 114.

As shown in FIG. 11, the level measuring assembly 136 can comprise graduated marking 138 on each bulk containers 110 allowing an operator to visually monitor the changing depth of the concentrate within the bulk container 110.

As shown in FIG. 12, according to an embodiment of the present invention, the level measuring assembly 136 can further comprise a float apparatus 140 for monitoring the depth of the concentrate within the bulk container 110. The float apparatus 140 further comprises a float 142 and a float channel 144 for guiding the float 142 along a generally vertical axis as the depth of the concentrate within the bulk container 110 changes. The float container 140 can comprise a magnetic, LVDT, Hall effect, magnetostrictive or other float system suitable for determining the change in depth of the concentrate. According to an embodiment of the present invention, the float apparatus 140 can comprise corrosive resistive materials, such as non-metallic materials, to prevent corrosion caused by the caustic concentrate.

Figure 13:
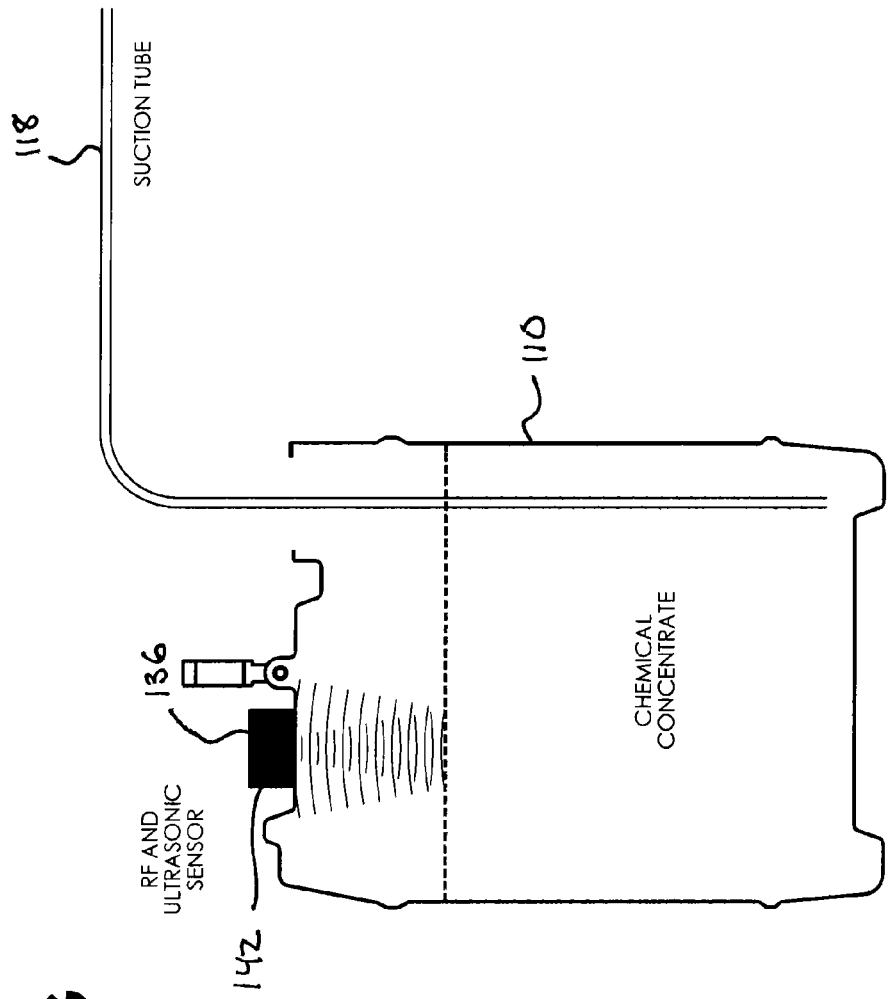
FIG. 13 is a schematic view of the supply system of the chemical dispensing system for an automated car wash depicted in FIG. 7, according to an embodiment of the present invention.
Figure 14:
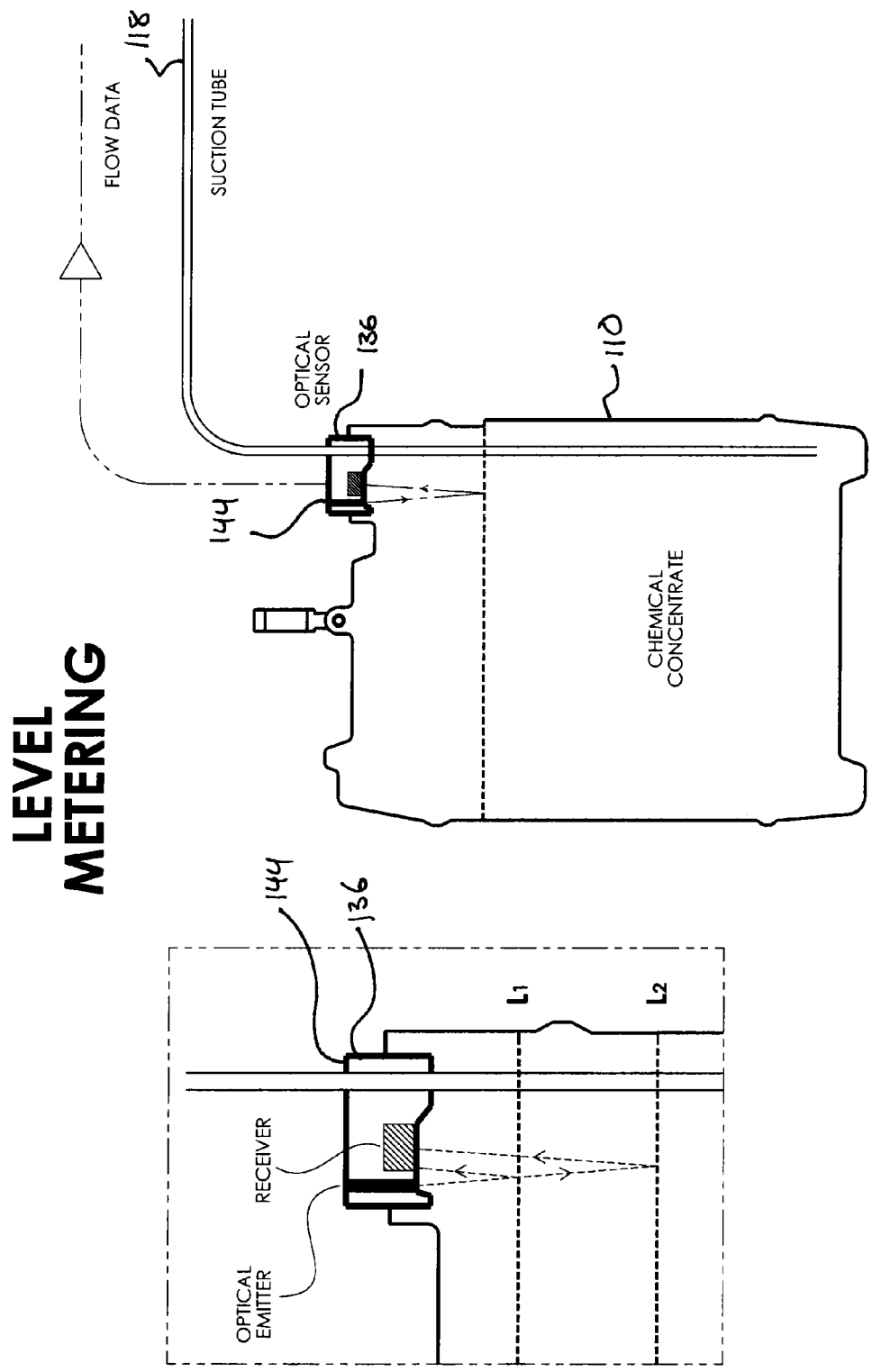
FIG. 14 is a schematic view of the supply system of the chemical dispensing system for an automated car wash depicted in FIG. 7, according to an embodiment of the present invention.

As shown in FIGS. 13 and 14, according to an embodiment of the present invention, the level measuring assembly 136 can comprise an RF/ultrasonic sensor 142 for reflecting RF and ultrasonic waves of the surface of the concentrate within the bulk container 110 to measure the change in depth of the concentrate within the container 110. Alternatively, the level measuring assembly 136 can comprise an optical sensor 144 for reflecting light off the surface of the concentrate and measure the refraction of the light to determine the depth of the concentrate. According to an embodiment of the present invention, the level measuring assembly 136 can be positioned at the top of the bulk container 110 to prevent direct or prolonged contact with the concentrate container within the bulk container 110.

Figure 15:
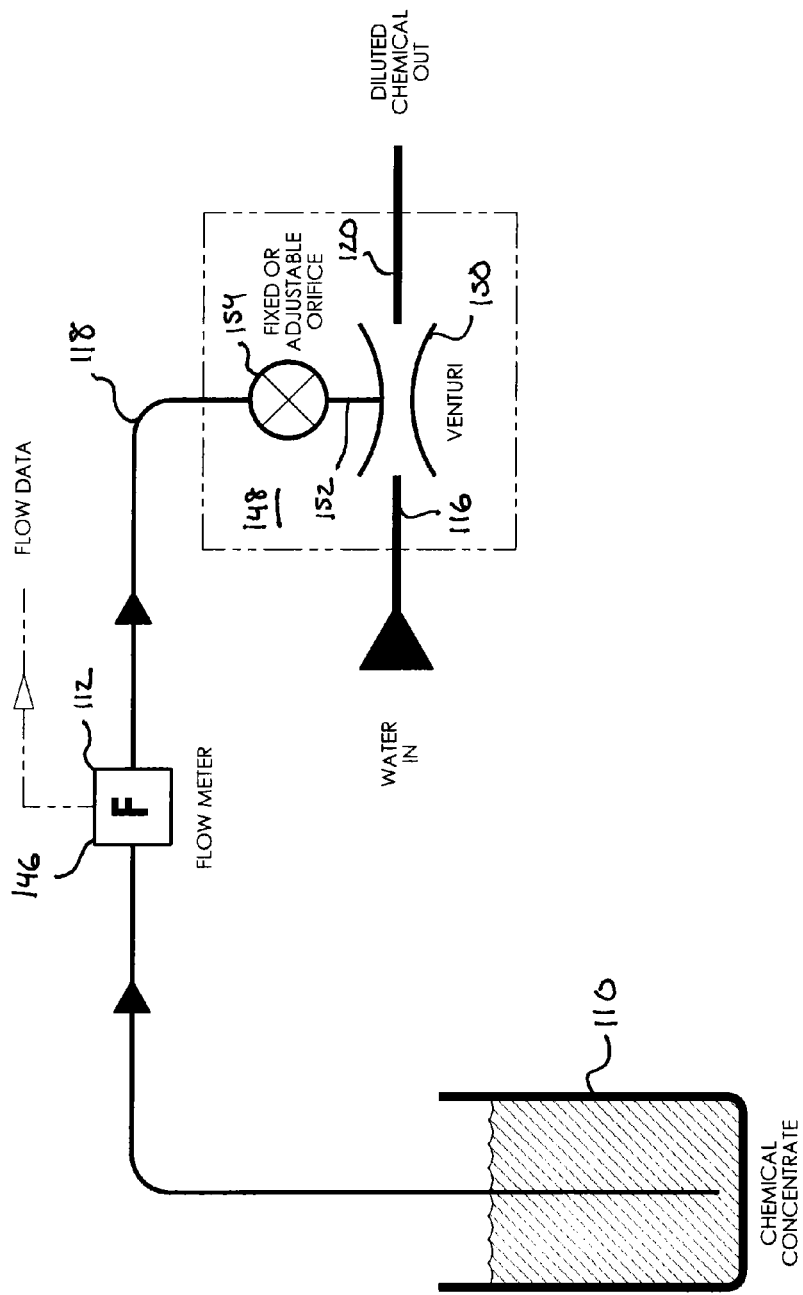
FIG. 15 is a schematic view of the supply and mixing systems of the chemical dispensing system for an automated car wash depicted in FIG. 7, according to an embodiment of the present invention.

As shown in FIG. 15, the monitoring assembly 112 can comprise a flow meter 146 for measuring the actual flow rate of the concentrate between the bulk container 110 and the dilution/mixing apparatus 114. Unlike the load cell 130, which calculates the flow rate of the concentrate from the change in weight over time, the flow meter 146 measures the actual mass or volumetric flow rate of concentrate leaving the bulk container 110. As the flow meter 146 is positioned in the concentrate stream, the flow meter 146 comprises non-metallic components to resist corrosion or damage caused by the highly corrosive or caustic concentrate. The flow meter 146 is adapted to detect flow rates as low as 0.1 mL/sec and can comprise a turbine; radial, axial, paddle wheel, positive displacement; piston, diaphragm, gear, sonic, shedding vortex, differential pressure, thermal dispersion, mass flow, or hot wire type flow meters.

Each bulk container 110 can comprise a rigid container, a chemically resistant bag and other suitable containers for retaining the often highly corrosive or caustic concentrated cleaning chemicals. According to an embodiment of the present invention, the bulk container 110 is adapted to contain and supply hyper concentrates of the cleaning agent. According to an embodiment of the present invention, the supply system 104 can store and supply up to 20 different concentrates of various cleaning chemicals in a plurality of bulk containers 110.

According to an embodiment of the present invention, each bulk container 110 can further comprise an RFID tag 147 for inventory control, insuring the correct chemicals are used, authenticating OEM chemicals, and insuring that shelf-life parameters are not violated. Additionally, RFID tags 147 can be linked to control software for the system 102 to automatically set and adjust the dilution rates to predetermined amounts for each concentrate.

Figure 16:
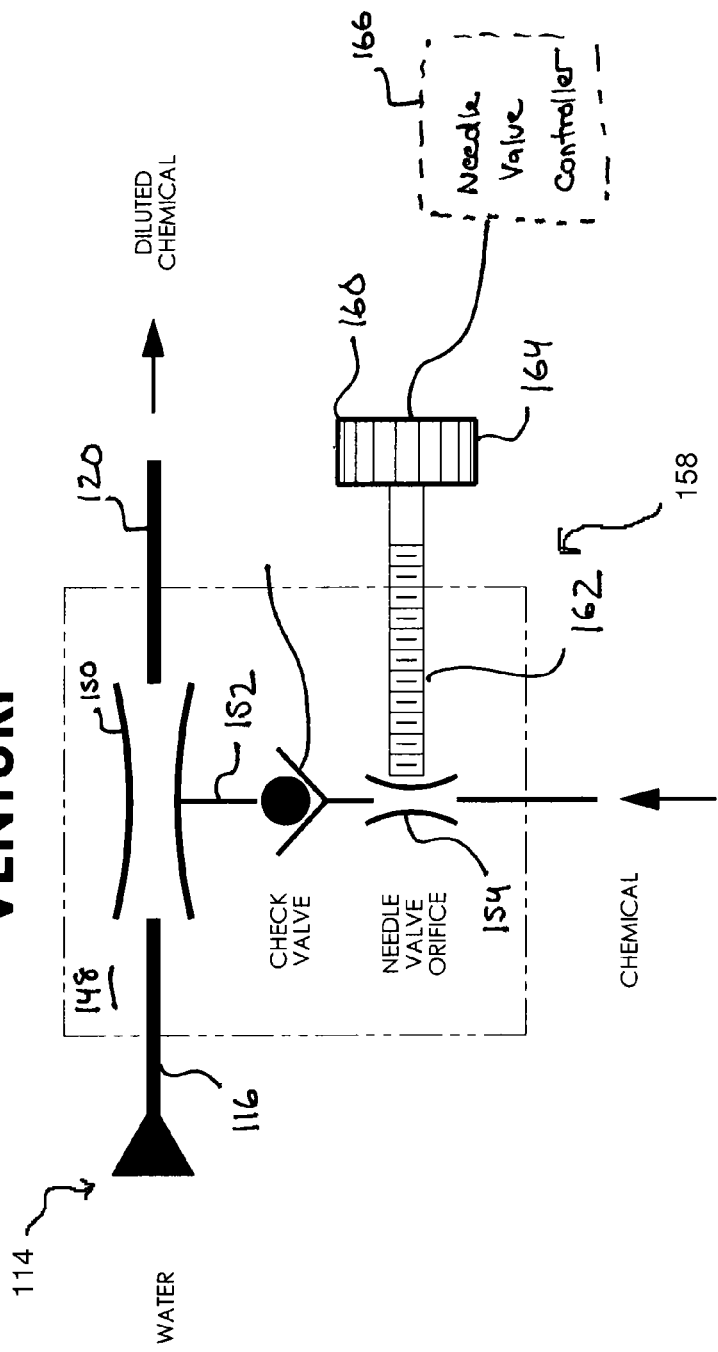
FIG. 16 is a schematic view of the mixing systems of the chemical dispensing system for an automated car wash depicted in FIG. 7, according to an embodiment of the present invention.
Figure 17:
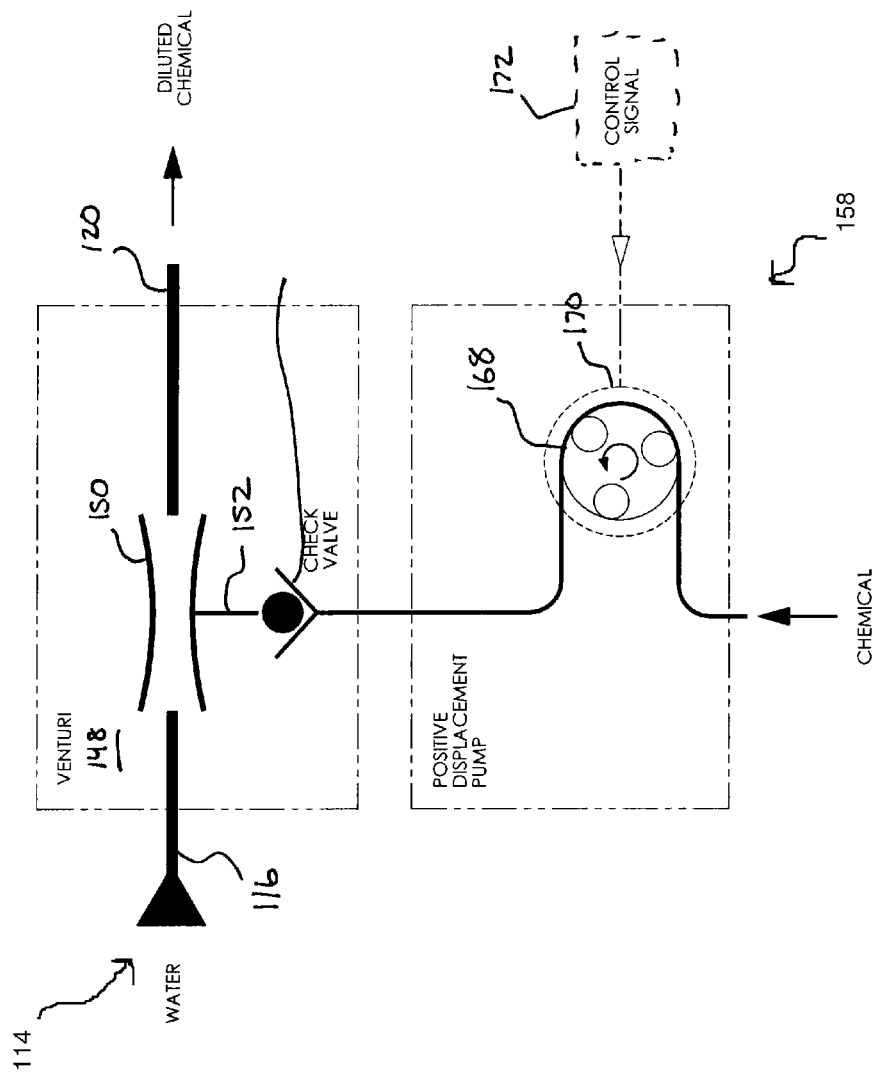
FIG. 17 is a schematic view of the mixing systems of the chemical dispensing system for an automated car wash depicted in FIG. 8, according to an embodiment of the present invention.

As shown in FIGS. 16 and 17, the dilution/mixing apparatus 114 can comprise a venturi eductor 148 having a venturi tube 150 intersected with an injector tube 152. The venturi tube 150 comprises a gradually increasing cross-sectional area to cause a pressure change in the fluid flowing through the venturi tube 150 to draw fluid from the injector tube 152. The injector tube 152 can further comprise an orifice 154 defining the effective diameter of the injector tube 152. The venturi tube 150 is operably linked to the process water inlet 116 while the injector tube 152 is operably linked to the concentrate inlet 118. In operation, process water is forced through the venturi tube 150 creating a pressure difference in the process water stream, which draws concentrate from the concentrate inlet 118 to create the cleaning solution. According to an embodiment of the present invention, the mixing system 106 can further comprise a static mixer for mixing the injected concentrate with the process water stream to insure the concentrate is evenly diluted in the process water. According to an embodiment of the present invention, venturi eductor 148 can further comprise a check valve 156 disposed within the injector tube 152 preventing the process water from entering the injector tube 152 or back flow of the diluted cleaning solution.

As shown in FIG. 2, a typical venturi eductor 28 comprises a fixed diameter orifice 32, which pins the flow rate of concentrate through the injector tube 30 to the flow rate of the process water stream through the venturi tube 28. As the process water stream is often drawn from the water grid, the flow rate of process water stream entering the system 2 is typically fixed or beyond the control of the operator. Consequently, with fixed diameter orifices 32, the operator has little control over the concentrate flow rate through the injector tube 30.

As shown in FIGS. 16 and 17, the dilution/mixing apparatus 114 further comprises a concentrate flow control 158 for regulating the flow of concentrate through the injector tube 152 and into the venturi tube 150. As shown in FIG. 16, the concentrate flow control 158 can comprise a needle valve 160 for changing the effective diameter of the orifice 154. The needle valve 160 comprises a needle 162 and an actuator 164 for inserting the needle 162 at least partly into the orifice 154 to reduce the effective diameter of the orifice 154 and retracting the needle 162 at least partly from the orifice 154 to increase the effective diameter of the orifice 154. The actuator 164 can comprise, but is not limited to, an electric solenoid, an electric motor, or pneumatic or hydraulic actuators. In some embodiments, the needle valve 160 can be manually actuated. According to an embodiment of the present invention, the needle valve 160 can further comprise a needle valve controller 166 for controlling the actuation of the needle 162.

Figure 18:
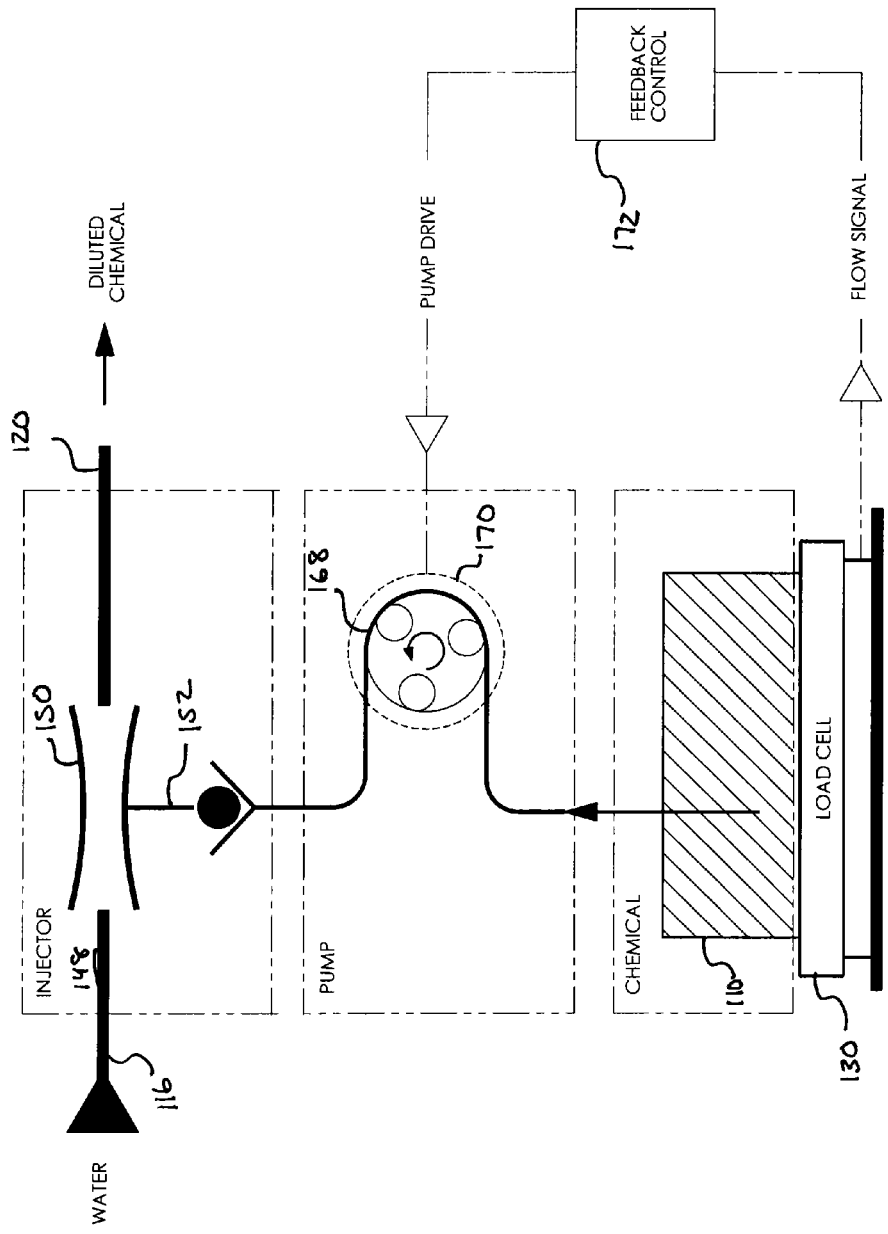
FIG. 18 is a schematic view of the mixing and supply systems of the chemical dispensing system for an automated car wash depicted in FIG. 17, according to an embodiment of the present invention.
Figure 19:
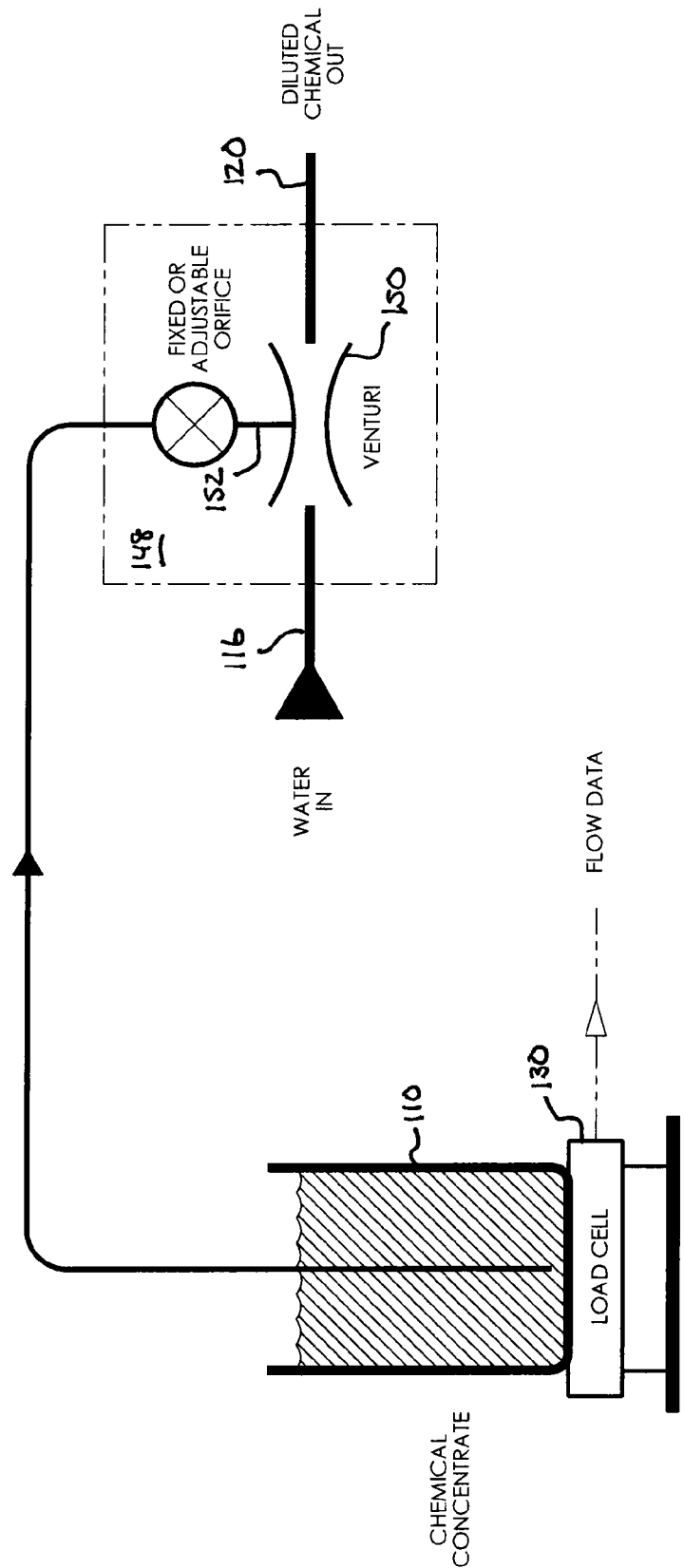
FIG. 19 is a schematic view of the mixing and supply systems of the chemical dispensing system for an automated car wash depicted in FIG. 17, according to an embodiment of the present invention.

As shown in FIG. 17, according to an embodiment of the present invention, the concentrate flow control 158 can alternatively comprise a positive displacement pump 168 instead of an orifice 154 and a pump drive 170 for driving the displacement pump 168. According to an embodiment of the present invention, the displacement pump 168 can comprise a peristaltic pump for pumping of the concentrate through the injector tube 152 by pinching the injector tube 152 to push the concentrate through the injector tube 152. In this configuration, the displacement pump 168 can pump the concentrate through the injector tube 152 without exposing the components of the pump 168 to the corrosive and caustic concentrate. The pump drive 170 operably linked to the displacement pump 168 and adapted to drive the displacement pump 168 to force-feed, limit or stop the flow of concentrate through the injector tube 152. According to an embodiment of the present invention, the concentrate flow control 158 can further comprise a pump controller 172 for controlling the operation of the pump drive 170. As shown in FIGS. 18-19, according to an embodiment of the present invention, the pump controller 172 is adapted to receive information on the flow rate of the concentrate from the bulk container 110 from the monitoring assembly 112 such as the load cell 130 and adjust the operation of the pump drive 60 according to the measured concentrate flow rate.

According to an embodiment of the present invention, the process water inlet 118 can further comprise a process water flow meter 174 for measuring the flow rate of the process water stream into the system 102. The process water flow meter 174 is adapted to collect and transmit the flow rate information on the flow rate of process water into the system 102.

Figure 20:
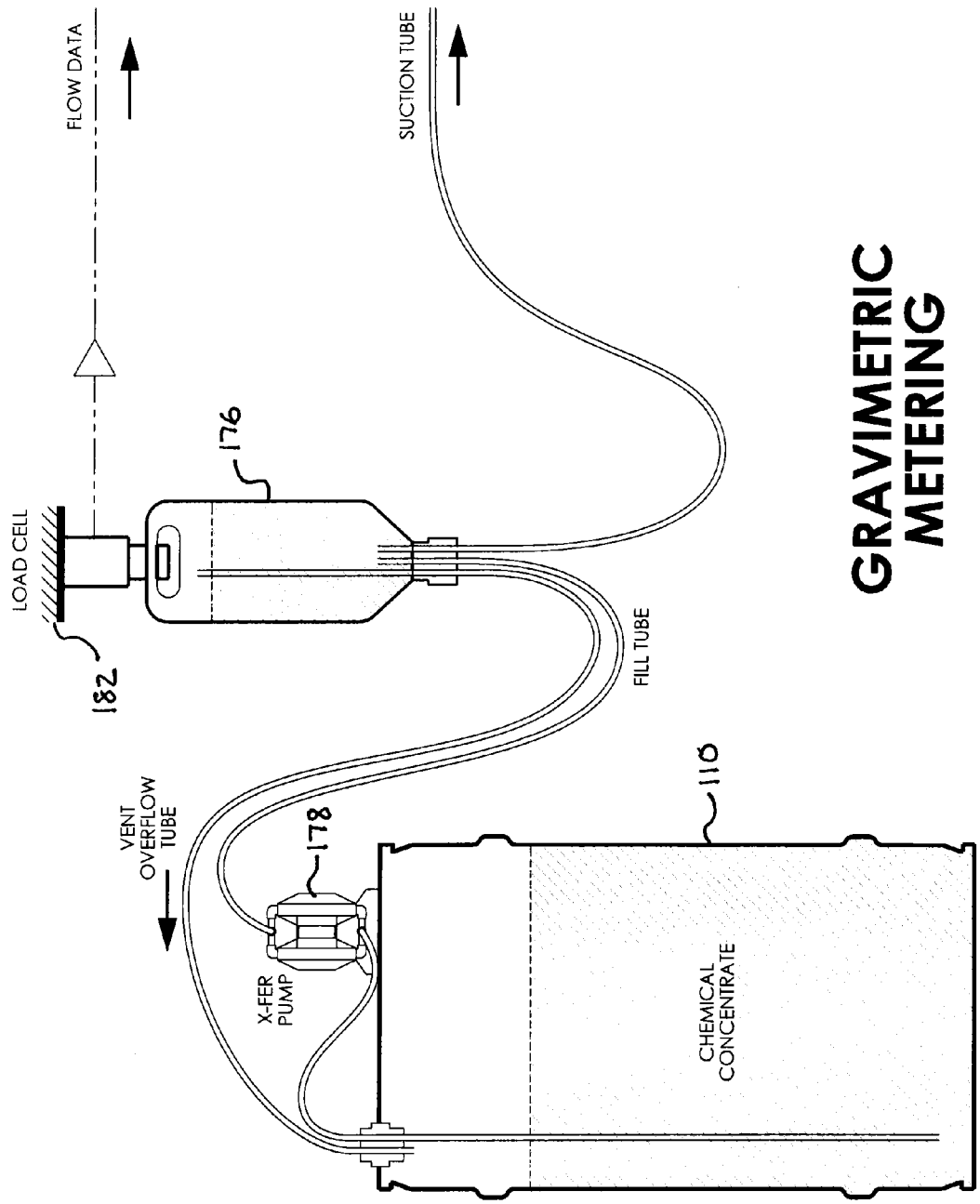
FIG. 20 is a representative view of the supply and mixing system of a chemical dispensing system for an automated car wash according to an embodiment of the present invention.

As shown in FIG. 20, the supply system can further comprise a dosing reservoir 176 for receiving a predetermined quantity of concentrate and a transfer pump 178. The transfer pump 178 is adapted to transfer a predetermined quantity of concentrate from the bulk container 110 into the dosing reservoir 176. The premeasured "dose" of cleaning concentrate is then diluted into the processing stream. According to an embodiment of the present invention, the dosing reservoir 176 can further comprise a load cell 182 adapted to measure the amount of concentrate contained within the dosing reservoir 176 and determine the amount of concentrate diluted into the process water stream.

Figure 21:
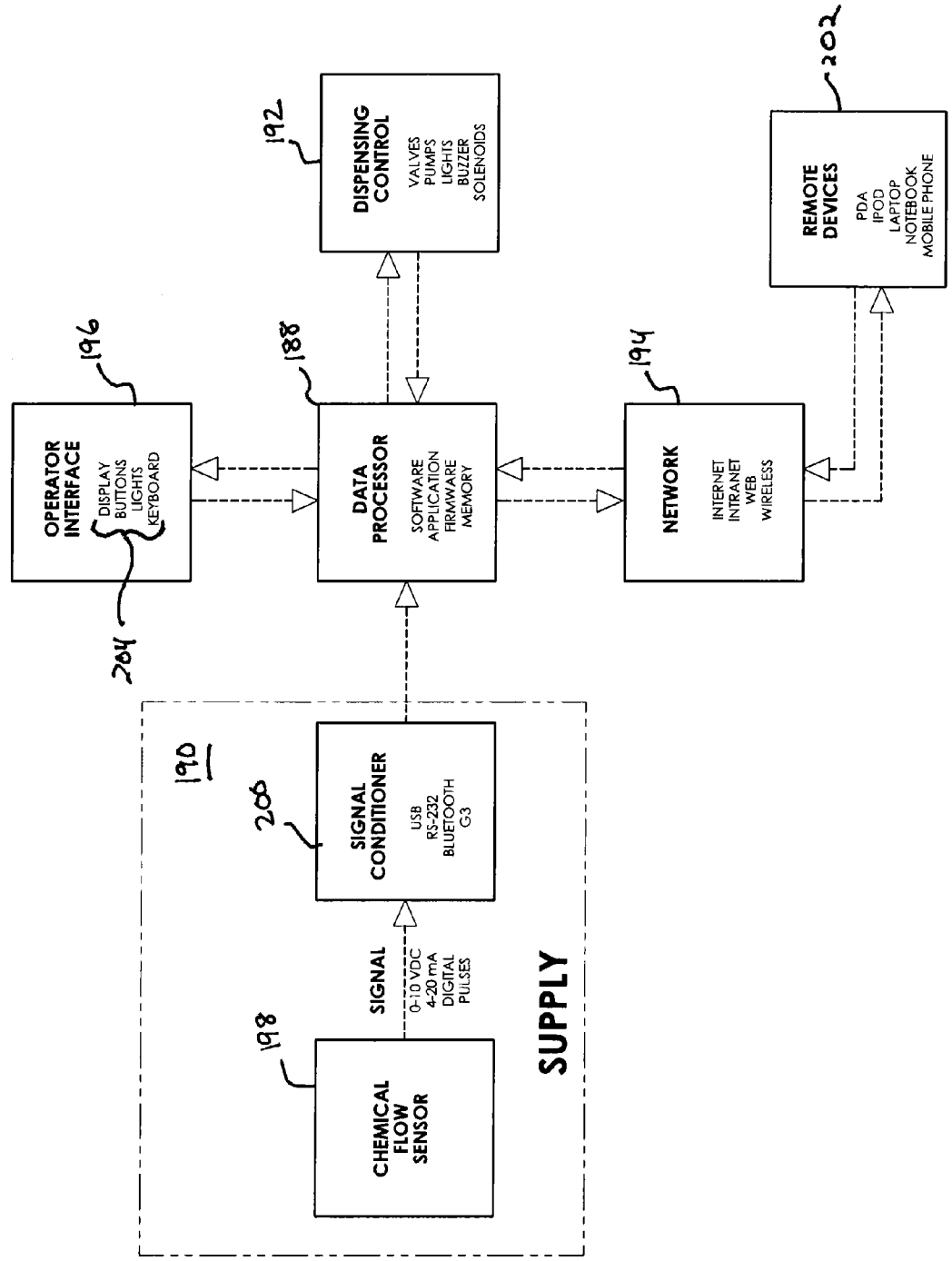
FIG. 21 is a flow chart of a control system for an automated car wash according to an embodiment of the present invention.
Figure 22:
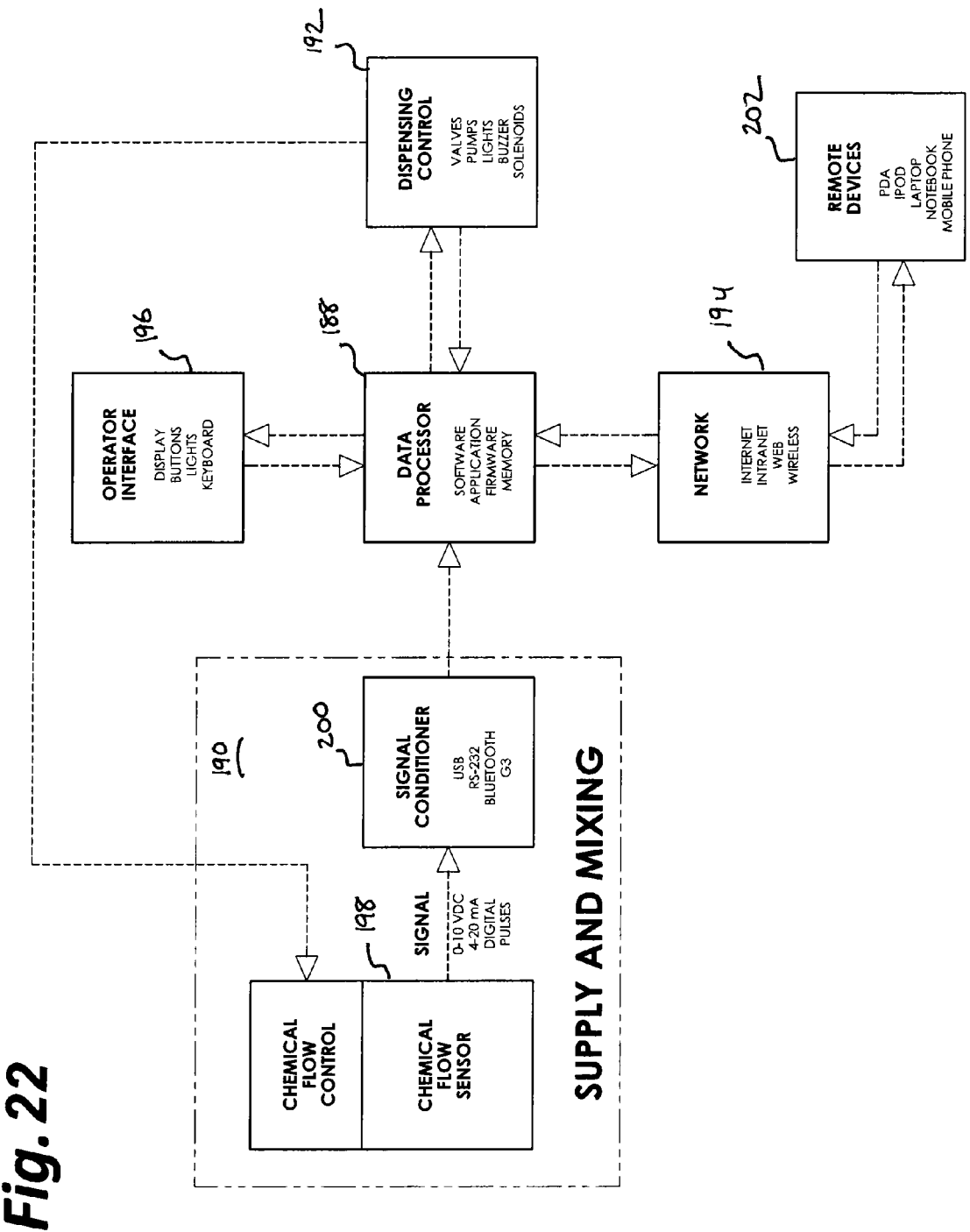
FIG. 22 is a flow chart of a control system for an automated car wash according to an embodiment of the present invention.

As shown in FIGS. 21-22, according to an embodiment of the present invention, a car wash system 102 can further comprise a control system 184 having a data processor 188, a supply control 190, a dispensing control 192, a networking portion 194 and an operator interface 196. The supply control 190 further comprises chemical flow sensor 198 and signal conditioner 200. The data processor 188 can comprise a microprocessor such as programmable logic controller or computer processor for receiving and processing information from the system 102. The dispensing control 192 is adapted to control the output of the dispensing system 108. For example, when the program software of the dispensing control 192 in the microprocessor determines when the chemical solution is to be dispensed from the nozzle apparatus 126 and activates the displacement pump 168 to pressurize and pump the cleaning chemical solution through the nozzle apparatus 126. The networking portion 194 is adapted to link the data processor 188 to any wired topography such as RS-232, Ethernet, Field buss, 2-wire telephone, DSL, cable, fiber optic cable etc. or wireless Bluetooth, 3G, or satellite network to allow remote or local access to the system 102. According to an embodiment of the present invention, the remote devices 202 adapted to interface with the networking portion 194 can be linked to the system 102 to control the system or change the system parameters. The operator interface 196 is operably linked to the data processor 188 and can comprise input devices 204 allowing a user to input program directives into the data processor 80 to change the operating parameters of the system 2.

As shown in FIG. 21, the chemical flow sensor 198 is adapted to transmit chemical usage data to the signal conditioner 200. The chemical flow sensor 198 is adapted to obtain flow information from the monitoring assembly 112 regarding the usage of the concentrate within the bulk container 110 and translate the information into an electrical signal containing information on the flow of concentrate from the bulk container 110. The electrical signal can comprise a series of digital voltage pulses, an analog current loop such as 4-20 mA, or an analog voltage such as 0-10 VDC. The information on the concentrate usage in each bulk container 10 is transmitted from the chemical flow sensor 198 to the signal conditioner 200, which forwards the information onto the data processor 188. The signal conditioner 200 is adapted to convert the electrical signal into logic level digital code for input into the data processing unit 188. According to an embodiment of the present invention, the signal conditioner 200 can be linked to the data processing unit 188 via a USB connection.

The chemical flow sensor 198 provides real time information on the rate of chemical usage to the data processor 188. The data processor 188 is adapted to translate the information to provide a cost per dispensing event calculation. The chemical usage information can be displaced as a Cost per Car rate. The information allows the operator to make changes to the system behavior through the operator interface 192 to change the behavior of the car wash system 102.

Although specific examples have been illustrated and described herein, it will be appreciated by those of ordinary skill in the art that any arrangement calculated to achieve the same purpose could be substituted for the specific example shown. This application is intended to cover adaptations or variations of the present subject matter. Therefore, it is intended that the invention be defined by the attached claims and their legal equivalents.

What is claimed:

1. A method for monitoring and controlling cleaning chemical usage in a car wash, comprising:
providing a supply system including a monitoring assembly for measuring an amount of a concentrate of cleaning chemical contained within a bulk concentrate storage container;
regulating the amount of concentrate supplied from the bulk concentrate storage container to a venturi tube of a venturi eductor using a concentrate flow control, the concentrate flow control comprising:
an injector tube fluidly connected to the venturi tube;
a check valve positioned within the injector tube to prevent fluid in the venturi tube from entering the bulk concentrate storage container;
a needle configured to be at least partially inserted into an orifice of the injector tube;
an actuator connected to the needle, wherein the actuator inserts the needle further into the orifice to reduce an effective diameter of the orifice to decrease the amount of concentrate supplied to a mixing system and retracts the needle from the orifice to increase the effective diameter of the orifice to increase the amount of concentrate supplied to the mixing system; and
a needle valve controller coupled to the actuator, wherein the needle valve controller controls the actuator to insert or retract the needle to regulate the amount of concentrate supplied to a mixing system such that the concentrate can be combined with a water stream at a predetermined dilution ratio to form a car wash cleaning solution;
monitoring the bulk concentrate storage container in real time to determine usage of the concentrate supplied to the mixing system prior to any mixing of the concentrate with the water stream;
transmitting concentrate usage information from the bulk concentrate storage container to a control system in real time, wherein said control system is communicatively coupled to the concentrate flow control and includes an operator interface for adjusting the amount of concentrate supplied from the bulk concentrate storage container to the mixing system based on the concentrate usage information; and selectively adjusting, by the control system, the amount of concentrate supplied from the bulk concentrate storage container by controlling the actuator to insert or retract the needle into the orifice based the concentrate usage information.

2. The method of claim 1, wherein the step of monitoring the bulk concentrate storage container further comprises:

weighing the bulk concentrate storage container with a load cell to determine the amount of concentrate supplied to the mixing system prior to any mixing of the concentrate with the water stream for each nozzle dispensing event.

3. The method of claim 1, wherein the step of monitoring the bulk concentrate storage container further comprises:

sensing a level of the concentrate in the bulk concentrate storage container with a level sensor.

4. The method of claim 1, wherein the step of monitoring the bulk concentrate storage container further comprises:

determining a concentrate flow rate of the concentrate from the bulk concentrate storage container to the mixing system with a flow meter.

5. The method of claim 1, wherein the step of regulating comprises adjusting a concentrate flow rate between the bulk concentrate storage container and the mixing system with the concentrate flow control operating as directed by the control system by activating the actuator to insert or retract the needle from the orifice.

6. The method of claim 1, further comprising:

communicating chemical identity information identifying the concentrate in the bulk concentrate storage container to the control system.

7. The method of claim 1, further comprising:

calculating a cost per car rate based upon the concentrate usage information transmitted to the control system.

8. The method of claim 1, wherein regulating the amount of concentrate supplied from the bulk concentrate storage container to a mixing system, further comprises:

selecting the effective diameter of the orifice within a venturi eductor in the mixing system for a desired amount of concentrate.

9. The method of claim 5, wherein the step of adjusting the concentrate flow rate, further comprises:

positioning a pump between the bulk concentrate storage container and the mixing system; and driving the pump with the control system to selectively control the concentrate flow rate supplied to the mixing system from the bulk concentrate storage container.

10. The method of claim 6, wherein the chemical identity information identifying the concentrate in the bulk concentrate storage container is contained on a Radio Frequency Identification tag on the bulk concentrate storage container.

11. The method of claim 6, wherein the control system regulates the concentrate flow control based on the chemical identity information communicated to the control system.

12. The method of claim 7, wherein regulating the amount of concentrate supplied from the bulk concentrate storage container, further comprises:

utilizing the operator interface to change the amount of concentrate supplied from the bulk concentrate storage container prior to any mixing of the concentrate and the water stream based on the cost per car rate.

13. The method of claim 7, further comprising:

displaying the calculated cost per car on the control system.

14. A method for monitoring and controlling cleaning chemical usage in a car wash, comprising:

regulating a concentrate flow that is mixed in a venturi tube of a venturi educator with a water stream to form a cleaning solution, the concentrate flow being regulated by a concentrate flow control, the concentrate flow control comprising:

an injector tube in fluid communication with the venturi tube;

a needle configured to be inserted into an orifice of the injector tube;

an actuator coupled to the needle, wherein the actuator inserts the needle into the orifice to reduce an effective diameter of the orifice and decrease an amount of concentrate supplied to the venturi tube and retracts the needle from the orifice to increase the effective diameter of the orifice and increase the amount of concentrate supplied to the venturi tube and thereby regulate the concentrate flow;

measuring a bulk concentrate storage container to determine an amount of a concentrate of cleaning chemical that is dispensed from the bulk storage container as the concentrate flow, wherein the measurement of the bulk concentrate storage tank occurs prior to any mixing of the concentrate flow with the water stream;

transmitting the amount of concentrate dispensed from the bulk concentrate storage container to a data processor on a real time basis, the data processor communicatively coupled to the concentrate flow control; and selectively adjusting, by the data processor, the amount of concentrate flow from the bulk concentrate storage container based the amount of concentrate dispensed by controlling the actuator to insert or retract the needle into the orifice.

15. A method for monitoring and controlling cleaning chemical usage in a car wash, comprising:

monitoring a bulk concentrate container that contains a concentrate of cleaning chemical, the monitoring generating usage data of the concentrate of cleaning chemical prior to any mixing of the concentrate of cleaning chemical with a water stream, wherein said usage data is transmitted to a control system on a real time basis;

regulating a concentrate flow of the concentrate of cleaning chemical from the bulk container and into a concentrate inlet on a mixing system, the concentrate flow being regulated by a concentrate flow control, the concentrate flow control coupled to a venturi tube of a venturi educator, the concentrate flow comprising:

an injector tube fluidly connected to the venturi tube;

a check valve positioned within the injector tube, wherein the check valve prevents fluid in the venturi tube from entering the bulk container;

a needle configured to be inserted or retracted from an orifice of the injector tube;

an actuator connected to the needle, wherein the actuator inserts the needle into the orifice to reduce an effective diameter of the orifice and reduce the amount of concentrate supplied to the mixing system from the bulk container and retracts the needle from the orifice to increase the effective diameter of the orifice and increase the amount of concentrate supplied to the mixing system from the bulk container; and a needle valve controller coupled to the actuator, wherein the needle valve controller controls the actuator to insert or retract the needle;

mixing the concentrate flow with the water stream in the venturi tube to form a cleaning solution;
dispensing the cleaning solution on a vehicle; and
adjusting the concentrate flow control with the control system to change the concentrate flow that is mixed with the water stream based on the transmitted usage data.

\* \* \* \* \*